(12) United States Patent
Itoh

(10) Patent No.: US 8,159,685 B2
(45) Date of Patent: Apr. 17, 2012

(54) IMAGE PROCESSING APPARATUS AND IMAGE PROCESSING METHOD CAPABLE OF EASILY PERFORMING WORK TO ARRANGE PAGES OF DISCHARGED RECORDING PAPER IN CASE OF MULTI-FEEDING OF ORIGINAL

(75) Inventor: Manabu Itoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1431 days.

(21) Appl. No.: 11/655,845

(22) Filed: Jan. 22, 2007

(65) Prior Publication Data

US 2007/0171438 A1 Jul. 26, 2007

(30) Foreign Application Priority Data

Jan. 23, 2006 (JP) ................. 2006-014204

(51) Int. Cl.
*G06K 15/00* (2006.01)
(52) U.S. Cl. ........ 358/1.12; 271/122; 271/176; 271/110
(58) Field of Classification Search ........................ None
See application file for complete search history.

(56) References Cited

U.S. PATENT DOCUMENTS

| | | | | |
|---|---|---|---|---|
| 6,264,189 B1 * | 7/2001 | Kawata | ........................ | 271/176 |
| 2003/0214091 A1 * | 11/2003 | Suzuki et al. | ................... | 270/17 |
| 2004/0145112 A1 * | 7/2004 | Matsutomo et al. | .......... | 271/207 |
| 2004/0188916 A1 * | 9/2004 | Tsukamoto et al. | .......... | 271/110 |
| 2004/0234169 A1 * | 11/2004 | Tojo | .............................. | 382/305 |
| 2005/0127160 A1 * | 6/2005 | Fujikawa | ....................... | 235/379 |
| 2005/0145689 A1 * | 7/2005 | Osawa et al. | ................. | 235/379 |
| 2005/0228535 A1 * | 10/2005 | Simonis et al. | ............... | 700/228 |

FOREIGN PATENT DOCUMENTS

| | | |
|---|---|---|
| JP | 10-236717 A | 9/1998 |
| JP | 2004-170729 A | 6/2004 |
| JP | 2005-173472 A | 6/2005 |

\* cited by examiner

*Primary Examiner* — Vincent Rudolph

(74) *Attorney, Agent, or Firm* — Birch, Stewart, Kolasch & Birch, LLP

(57) ABSTRACT

In one embodiment of an image processing apparatus, when multi-feeding during transport of originals is detected, except for the multi-fed originals, which are all of the originals simultaneously multi-fed by the multi-feeding, the images written on only the other remaining originals are recorded on recording paper; and a shifted discharge position in the discharge tray of only pre-multi-feeding original recording paper is different from a standard discharge position of other recorded recording paper, the pre-multi-feeding original recording paper being recording paper on which is recorded the image written on the original transported immediately before the original initially transported among the multi-fed originals.

16 Claims, 17 Drawing Sheets

| original page number (PA) | image data storage area | image present | multi-feeding | processing finished confirmation | shift necessary |
|---|---|---|---|---|---|
| 1 | D1 | O | | O | |
| 2 | D2 | O | | O | |
| 3 | D3 | O | | O | |
| 4 | D4 | O | | O | |
| 5 | D5 | O | | O | O |
| 6 | (*1) | (*1) | O | O | |
| 7 | (*1) | (*1) | O | O | |
| 8 | D8 | O | | O | |
| 9 | D9 | O | | O | |
| 10 | D10 | O | | O | |

FIG.4

| original page number (PA) | image data storage area | image present | multi-feeding | processing finished confirmation | shift necessary |
|---|---|---|---|---|---|
| 1 | D1 | ○ | | ○ | |
| 2 | D2 | ○ | | ○ | |
| 3 | D3 | ○ | | ○ | |
| 4 | D4 | ○ | | ○ | |
| 5 | D5 | ○ | | ○ | ○ |
| 6 | (*1) | (*1) | ○ | ○ | |
| 7 | (*1) | (*1) | ○ | ○ | |
| 8 | D8 | ○ | | ○ | |
| 9 | D9 | ○ | | ○ | |
| 10 | D10 | ○ | | ○ | |

FIG.11

| original page number (PA) | recording paper page number (PB) | image arrangement order (PC) | image data storage area | image present | multi-feeding | processing finished confirmation | shift necessary |
|---|---|---|---|---|---|---|---|
| 1 | 1 | 1 | D1 | O | | O | |
| 2 | 1 | 2 | D2 | O | | O | |
| 3 | 1 | 3 | D3 | O | | O | |
| 4 | 1 | 4 | D4 | O | | O | |
| 5 | 2 | 1 | D5 | O | | O | O |
| 6 | 2 | 2 | D6 | O | | O | O |
| 7 | 2 | 3 | D7 | O | | O | O |
| 8 | 2 | 4 | D8 | O | | O | O |
| 9 | 3 | 1 | D9 | O | | O | |
| 10 | 3 | 2 | D10 | O | | O | |
| 11 | 3 | 3 | (*2) | (*2) | O | O | |
| 12 | 3 | 4 | (*2) | (*2) | O | O | |
| 13 | 4 | 1 | D13 | O | | O | |
| 14 | 4 | 2 | D14 | O | | O | |
| 15 | 4 | 3 | D15 | O | | O | |
| 16 | 4 | 4 | D16 | O | | O | |
| 17 | 5 | 1 | D17 | O | | O | |
| 18 | 5 | 2 | D18 | O | | O | |

IMAGE PROCESSING APPARATUS AND IMAGE PROCESSING METHOD CAPABLE OF EASILY PERFORMING WORK TO ARRANGE PAGES OF DISCHARGED RECORDING PAPER IN CASE OF MULTI-FEEDING OF ORIGINAL

CROSS REFERENCE TO RELATED APPLICATIONS

This application claims priority under 35 U.S.C. §119(a) on Japanese Patent Application No. 2006-014204 filed in Japan on Jan. 23, 2006, the entire contents of which are hereby incorporated by reference.

BACKGROUND OF THE INVENTION

1. Field of Invention

The present invention relates to image processing apparatuses and image processing methods in which while transporting a plurality of pages of originals on which images are written, the originals are read page by page, the obtained images are recorded onto recording paper, and then the recording paper is discharged to a discharge tray.

2. Related Art

Recently, in image processing apparatuses that are so-called copy machines, which read a plurality of pages of originals and record them onto recording paper, acceleration of processing is advancing, and in such high speed processing, as a result of transporting the originals at high speed, multi-feeding of the originals occurs and a read image may be omitted. Thus, a problem may occur in which all of the images written on the originals cannot be recorded. So, image processing apparatuses are being developed in which, in order to prevent such a problem, a multi-feeding detection function that detects multi-feeding of the transported originals is provided by disposing a multi-feeding detection sensor in the original transport path.

On the other hand, among these image processing apparatuses, image processing apparatuses are being developed that are provided with a function to sort a plurality of sets of pages when discharging recording paper on which images have been recorded (for example, see JP H10-236717A). As such a function to sort a plurality of sets of pages, there are also, for example, methods in which the discharge position of the recording paper in the discharge tray is changed to a direction perpendicular to the discharge direction of the recording paper, but these are used only in order to realize the function to sort a plurality of sets of pages, as described above.

Incidentally, in the image processing apparatuses provided with a multi-feeding detection function described above, when original multi-feeding has been detected, rereading request of the multi-fed original is made, but even if rereading is performed, recording paper on which a reread image is recorded continues to be discharged as-is to the discharge tray where initially recorded and discharged recording paper exists.

Thus, in order to arrange the pages of discharged recording paper, it is necessary to perform time-consuming work in which first, recording paper on which reread images are recorded is removed from among the discharged recording paper, and then among the remaining recording paper, places where the recording paper on which the images written on the multi-fed originals were recorded is missing, which is where that recording paper is expected to be if there is no multi-feeding, are sought, and the previously removed recording paper is inserted into those places.

SUMMARY OF THE INVENTION

It is an object of the present invention to provide an image processing apparatus and image processing method in which when multi-feeding of an original has occurred, it is possible to easily perform work to arrange pages of discharged recording paper.

The image processing apparatus can be divided into two types: an image processing apparatus in which the image written on one page of an original is recorded on one page of recording paper (hereinafter, referred to as a single-page original single-page recording image processing apparatus), and an image processing apparatus in which the images written on a predetermined number of successive pages of originals are together recorded on one page of recording paper (hereinafter, referred to as a multi-page original single-page recording image processing apparatus). Among these, with a single-page original single-page recording image processing apparatus, the number of pages of originals is the same as the number of pages of recorded recording paper, while on the other hand, with a multi-page original single-page recording image processing apparatus, the number of pages of recorded recording paper is less than the number of pages of originals.

The present invention provides an image processing apparatus (single-page original single-page recording image processing apparatus) that records an image written on one page of an original to one page of recording paper, the image processing apparatus including an image reading portion that reads page by page a plurality of pages of originals on which images are written, the originals being placed in a reading tray, while transporting the originals, the image reading portion being able to detect multi-feeding of originals; a storage portion that stores an image read by the image reading portion; an image forming portion that forms an image on recording paper based on the image stored in the storage portion; a paper transport portion that transports the recording paper to allow image recording by the image forming portion, and discharges the recording paper to a discharge tray after image recording has been performed; a discharge position changing portion that can change a discharge position of the recording paper in the discharge tray; and a control portion that controls the image reading portion, the storage portion, the image forming portion, the paper transport portion, and the discharge position changing portion; wherein when the control portion detects multi-feeding during transport of the originals, except for the multi-fed originals, which are all of the originals simultaneously multi-fed by the multi-feeding, the images written on only the other remaining originals are recorded on recording paper; and the discharge position in the discharge tray of only pre-multi-feeding original recording paper is different from the discharge position of the other recorded recording paper, the pre-multi-feeding original recording paper being recording paper on which is recorded the image written on the original transported immediately before the original initially transported among the multi-fed originals.

Here, "multi-feeding" means that at least a portion of the plurality of originals are transported in a stacked-together state. "Multi-fed originals" refer to all of the originals multi-fed at the same time in the above multi-feeding. "Pre-multi-feeding original recording paper" refers to recording paper on which is recorded the image written on the original transported immediately before the original initially transported among the multi-fed originals.

With an image processing apparatus having such a configuration, when multi-feeding during original transport is detected, only the images written to remaining originals other than the multi-fed originals are recorded on recording paper. The pre-multi-feeding original recording paper alone is discharged to a different discharge position in the discharge tray than other recorded recording paper. Thus, the pre-multi-feeding original recording paper can be easily discerned from the other recorded recording paper. The place between the pre-multi-feeding original recording paper and the recorded recording paper discharged immediately after the pre-multi-feeding original recording paper is where the recording paper recorded with the image written on the multi-fed originals would properly be expected to be if there were no multi-feeding. Accordingly, it is easy for an operator or the like of the image processing apparatus to find the location to insert the recording paper on which the images written on the multi-fed originals is recorded.

Also, in the image processing apparatus (single-page original single-page recording image processing apparatus) of the present invention, the control portion may, when the multi-fed originals have been placed in the reading tray, after finishing all of the recording, record onto the recording paper the images obtained by reading page by page the multi-fed originals while transporting the multi-fed originals, and discharge all of the multi-fed original recording paper to a different discharge position in the discharge tray than the other recorded recording paper that is already discharged, except for the pre-multi-feeding original recording paper, the multi-fed original recording paper being the recording paper on which the images are recorded.

With an image processing apparatus having such a configuration, all of the multi-fed original recording paper is discharged to a different discharge position in the discharge tray than the other recorded recording paper that is already discharged, except for the pre-multi-feeding original recording paper. Accordingly, it is easy for an operator or the like of the image processing apparatus to find the multi-fed original recording paper, on which the images written on the multi-fed originals are recorded.

Also, in the image processing apparatus (single-page original single-page recording image processing apparatus) of the present invention, the image processing apparatus may further include a display portion; and the control portion, when multi-feeding has been detected, after reading of all of the originals is finished, may allow the display portion to perform a display that it is necessary to reread the multi-fed originals.

With an image processing apparatus having such a configuration, when multi-feeding during transport of originals is detected, a display that it is necessary to reread the multi-fed originals is performed. Accordingly, it is possible to prompt an operator or the like of the image processing apparatus to reread the multi-fed originals.

Alternatively, the present invention provides an image processing apparatus (multi-page original single-page recording image processing apparatus) that records images written on a predetermined number of successive pages of originals together on one page of recording paper, the image processing apparatus including an image reading portion that reads page by page a plurality of pages of originals on which images are written, the originals being placed in a reading tray, while transporting the originals, the image reading portion being able to detect multi-feeding of originals; a storage portion that stores an image read by the image reading portion; an image forming portion that forms an image on recording paper based on the image stored in the storage portion; a paper transport portion that transports the recording paper to allow image recording by the image forming portion, and discharges the recording paper to a discharge tray after image recording has been performed; a discharge position changing portion that can change a discharge position of the recording paper in the discharge tray; and a control portion that controls the image reading portion, the storage portion, the image forming portion, the paper transport portion, and the discharge position changing portion; wherein when the control portion detects multi-feeding during transport of the originals, except for the simultaneously recorded originals, which include the multi-fed originals and are originals on which are written images planned to be recorded together with images written on the multi-fed originals onto recording paper onto which images written on the multi-fed originals, which are all of the originals multi-fed at the same time by multi-feeding, are planned to be recorded if there is no multi-feeding, the images written on only the other remaining originals are recorded on recording paper; and the discharge position in the discharge tray of only pre-multi-feeding original recording paper is different from the discharge position of the other recorded recording paper, the pre-multi-feeding original recording paper being recording paper on which is recorded the image written on the original transported immediately before the original initially transported among the simultaneously recorded originals.

Here, "multi-feeding" and "multi-fed originals" have the same meaning as stated above. "Simultaneously recorded originals" refers to originals on which are written images planned to be recorded together with images written on the multi-fed originals onto recording paper onto which images written on the multi-fed originals are planned to be recorded if there is no multi-feeding. This simultaneously recorded originals include multi-fed originals. "Pre-multi-feeding original recording paper" refers to recording paper on which is recorded the image written on the original transported immediately before the original initially transported among the simultaneously recorded originals.

With an image processing apparatus having such a configuration, when multi-feeding during transport of originals is detected, except for simultaneously recorded originals, only the images written on the other remaining originals are recorded to recording paper. The pre-multi-feeding original recording paper alone is discharged to a different discharge position in the discharge tray than other recorded recording paper. Thus, the pre-multi-feeding original recording paper can be easily discerned from the other recorded recording paper. The place between the pre-multi-feeding original recording paper and the recorded recording paper discharged immediately after the pre-multi-feeding original recording paper is where the recording paper recorded with the image written on the multi-fed originals would properly be expected to be if there were no multi-feeding. Accordingly, it is easy for an operator or the like of the image processing apparatus to find the location to insert the recording paper on which the images written on the multi-fed originals is recorded.

Also, in the image processing apparatus (multi-page original single-page recording image processing apparatus) of the present invention, the control portion may, when the multi-fed originals are placed in the reading tray, after finishing all of the recording, record onto recording paper the images obtained by reading page by page the multi-fed originals while transporting the multi-fed originals, and the other images written on the simultaneously recorded originals, and discharge all of the multi-fed original recording paper to a different discharge position in the discharge tray than the other recorded recording paper that is already discharged, except for the pre-multi-feeding original recording paper, the multi-fed original recording paper being the recording paper on which the images have been recorded.

With an image processing apparatus having such a configuration, the images recorded on the multi-fed originals, and other images written on simultaneously recorded originals, are recorded on recording paper. All of the multi-fed original recording paper, which is the recording paper on which these images are recorded, is discharged to a different discharge position in the discharge tray than other recorded recording paper that is already discharged, except for the pre-multi-feeding original recording paper. Accordingly, it is easy for an operator or the like of the image processing apparatus to find the multi-fed original recording paper, which is recording paper on which the images written on the multi-fed originals are recorded.

Also, in the image processing apparatus (multi-page original single-page recording image processing apparatus) of the present invention, the image processing apparatus may further include a display portion; and the control portion, when multi-feeding has been detected, after reading of all of the originals is finished, may allow the display portion to perform a display that it is necessary to reread the multi-fed originals.

With an image processing apparatus having such a configuration, when multi-feeding during transport of originals is detected, a display that it is necessary to reread the multi-fed originals is performed. Accordingly, it is possible to prompt an operator or the like of the image processing apparatus to reread the multi-fed originals.

Also, in the multi-page original single-page recording image processing apparatus or the single-page original single-page recording image processing apparatus of the present invention, the control portion, after recording of the multi-fed original recording paper is finished, may allow the display portion to perform a display that it is necessary to arrange the page numbers of the recorded recording paper. Also, the control portion, after recording of the multi-fed original recording paper is finished, may allow the display portion to perform a display that in order to arrange the page numbers of the recorded recording paper, it is necessary to insert the multi-fed original recording paper between the pre-multi-feeding original recording paper and the recorded recording paper discharged immediately after the pre-multi-feeding original recording paper.

With an image processing apparatus having such a configuration, when multi-feeding during transport of originals has been detected, it is possible to easily make an operator or the like of the image processing apparatus aware that it is necessary to arrange the page numbers of the recorded recording paper, or alternatively, that it is necessary to insert the multi-fed original recording paper, which is the recording paper recorded with the images written on the multi-fed originals, in the place where recording paper recorded with images of the multi-fed originals is missing and would properly be expected to be if there were no multi-feeding.

Also, in the multi-page original single-page recording image processing apparatus or the single-page original single-page recording image processing apparatus of the present invention, it is preferable that the direction of the change of the discharge position by the discharge position changing portion is the direction perpendicular to the discharge direction of the recording paper. The reason is that such a configuration is comparatively easy to realize in an image processing apparatus.

Alternatively, the present invention provides an image processing method that records an image written on one page of an original to one page of recording paper, the image processing method including a step of reading page by page a plurality of pages of originals on which images are written, the originals being placed in a reading tray, while transporting the originals, it being possible in the image reading step to detect multi-feeding of originals; a step of storing an image read in the image reading step; a step of forming an image on recording paper based on the image stored in the image storage step; a step of transporting the recording paper to allow image recording by the image forming step, and discharging the recording paper to a discharge tray after image recording has been performed; a step of changing the discharge position of the recording paper in the discharge tray; and a step of controlling such that when detecting multi-feeding during transport of the originals, except for the multi-fed originals, the multi-fed originals being all of the originals simultaneously multi-fed by the multi-feeding, the images written on only the other remaining originals are recorded on recording paper, and controlling such that the discharge position in the discharge tray of only pre-multi-feeding original recording paper is different from the discharge position of the other recorded recording paper, the pre-multi-feeding original recording paper being recording paper on which is recorded the image written on the original transported immediately before the original initially transported among the multi-fed originals.

Alternatively, the present invention provides an image processing method that records images written on a predetermined number of successive pages of originals together on one page of recording paper, the image processing method including a step of reading page by page a plurality of pages of originals on which images are written, the originals being placed in a reading tray, while transporting the originals, it being possible in the image reading step to detect multi-feeding of originals; a step of storing an image read in the image reading step; a step of forming an image on recording paper based on the image stored in the image storage step; a step of transporting the recording paper to allow image recording by the image forming step, and discharging the recording paper to a discharge tray after image recording has been performed; a step of changing the discharge position of the recording paper in the discharge tray; and a step of controlling such that when detecting multi-feeding during transport of the originals, except for the simultaneously recorded originals, the simultaneously recorded originals including the multi-fed originals and being originals on which are written images planned to be recorded together with images written on the multi-fed originals onto recording paper onto which images written on the multi-fed originals, the multi-fed originals being all of the originals multi-fed at the same time by multi-feeding, are planned to be recorded if there is no multi-feeding, the images written on only the other remaining originals are recorded on recording paper, and controlling such that the discharge position in the discharge tray of only pre-multi-feeding original recording paper is different from the discharge position of the other recorded recording paper, the pre-multi-feeding original recording paper being recording paper on which is recorded the image written on the original transported immediately before the original initially transported among the simultaneously recorded originals.

BRIEF DESCRIPTION OF THE DRAWINGS

FIG. 4 is a data map list according to the first embodiment.

FIG. 11 is a data map list according to the second embodiment.

DESCRIPTION OF THE PREFERRED EMBODIMENTS

Hereinafter, embodiments of the present invention will be described in detail with reference to the accompanying drawings.

First Embodiment

An image processing apparatus according to a first embodiment is a digital copy machine that is an image processing apparatus provided with an image reading function and an image recording function. First, the overall configuration of the digital copy machine according to the first embodiment will be described.

<Overall Configuration of Digital Copy Machine>

Figure 1:
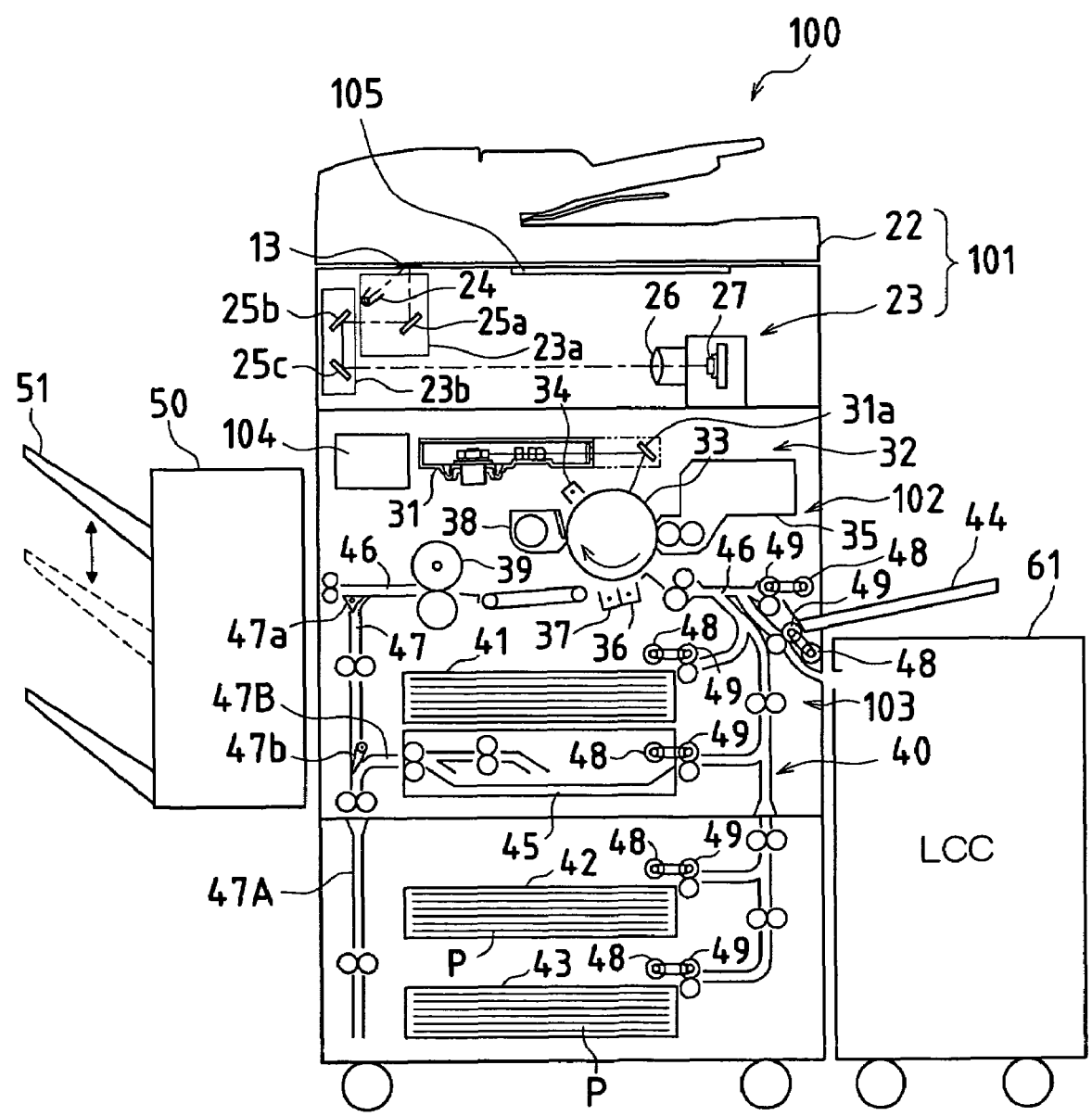
FIG. 1 is a configuration diagram showing the internal configuration of a digital copy machine according to a first embodiment.

FIG. 1 shows an overview of the internal configuration of a digital copy machine 100 according to the first embodiment. As shown in FIG. 1, the digital copy machine 100 is provided with a scanner portion 101, an image forming portion 102 that performs image formation to recording paper P used as a recording medium, a paper transport mechanism portion 103 that transports the recording paper P to the image forming portion 102, and a control portion 104. Also, a display portion 105, in which a display face employing an LCD faces upward, is provided in the vicinity of a side face of the scanner portion 101 in the top face of the main body of the digital copy machine 100. Each portion is described below.

<Control Portion>

The control portion 104 is configured with hardware such as a microcomputer and various memory, and software such as an operating system and various control programs and application programs. In addition to performing various control of the scanner portion 101, the image forming portion 102, the paper transport mechanism portion 103, and the display portion 105 described above, the control portion 104 performs control of the digital copy machine 100 as a whole.

<Scanner Portion>

Figure 2:
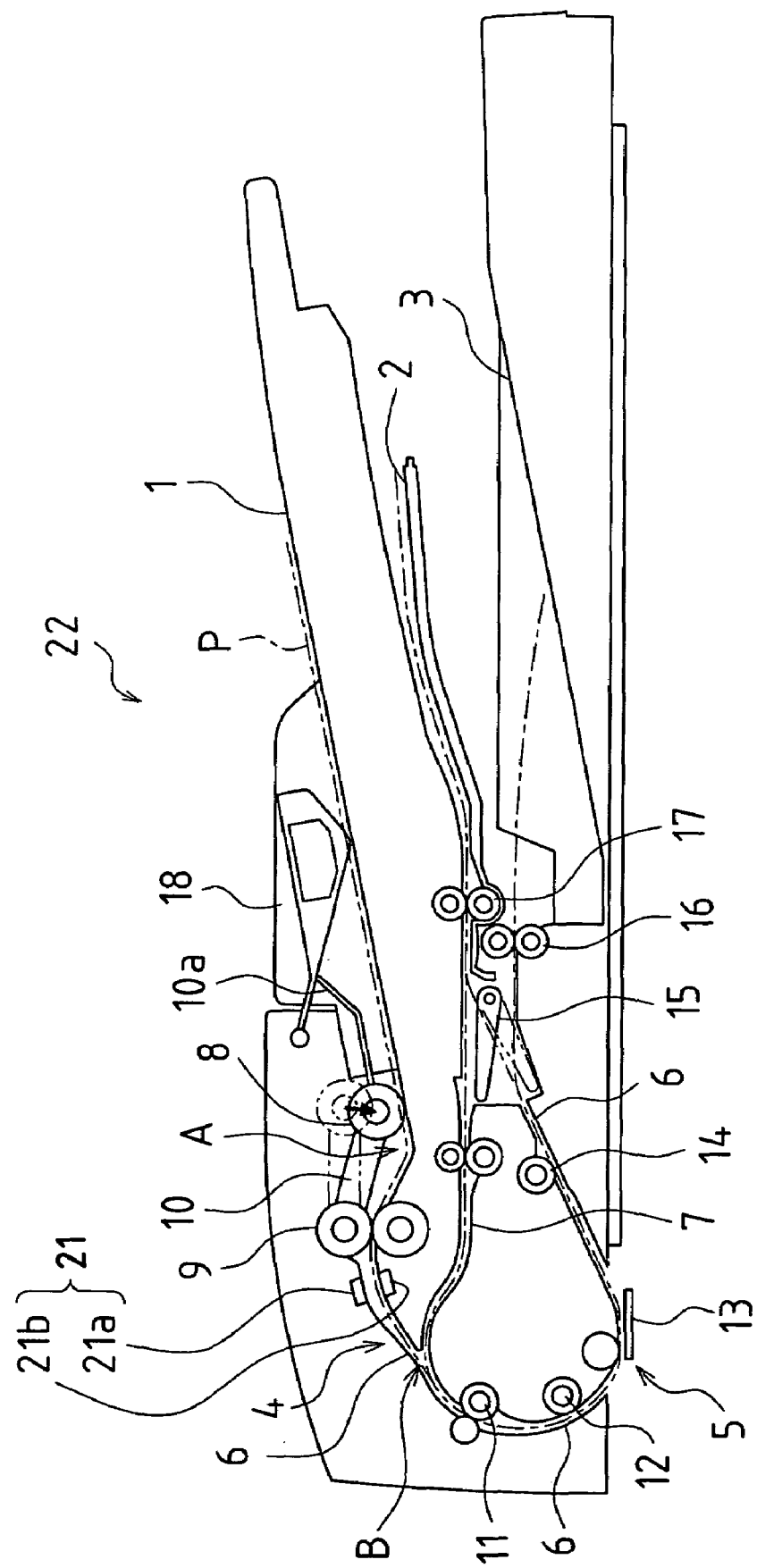
FIG. 2 is a cross-sectional diagram of an original feeding apparatus of the digital copy machine according to the first embodiment.

The scanner portion 101 includes an original feeding apparatus (RADF: Reversing Automatic Document Feeder) 22, and a scanner unit 23 for reading an image of an original transported by the original feeding apparatus 22. FIG. 2 is a cross-sectional view of the original feeding apparatus 22. The original feeding apparatus 22 includes an original tray 1 onto which originals are placed, an intermediate tray 2, an original discharge tray 3 onto which originals are discharged, and an original transport mechanism 4 that transports originals among the trays 1, 2, and 3.

The original tray 1 is provided with a sensor for detecting whether or not an original is placed in the original tray 1, and with this sensor the control portion 104 can check whether or not an original is placed in the original tray 1. Also, the original transport mechanism 4 includes a main transport path 6 for transporting an original placed in the original tray 1 to the intermediate tray 2 or the original discharge tray 3 via an original reading location 5, and a sub transport path 7 for feeding an original in the intermediate tray 2 by returning that original to the main transport path 6.

Figure 3:
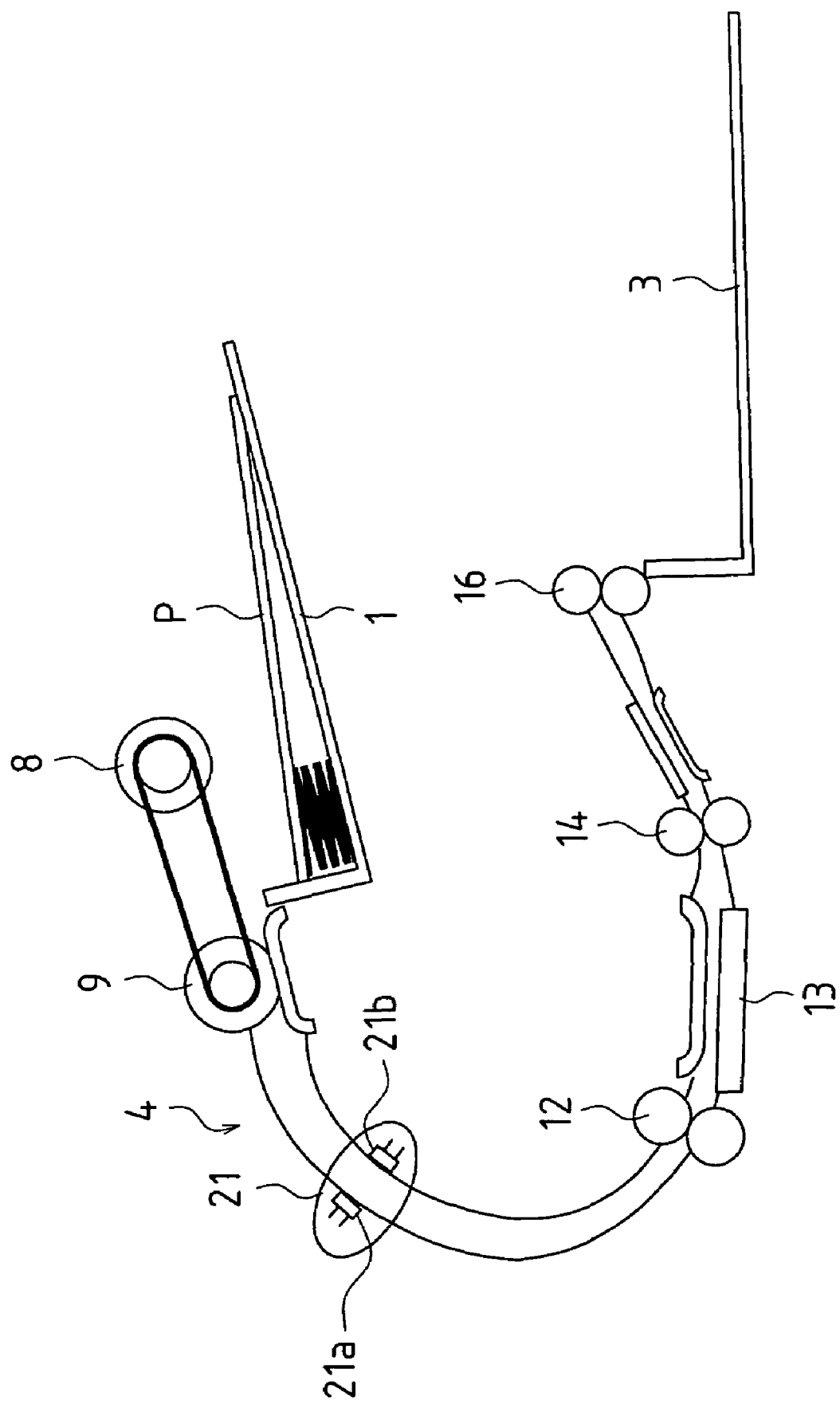
FIG. 3 is an explanatory diagram that shows a state in which a multi-feeding detection sensor is installed in the digital copy machine according to the first embodiment is installed.

Also, the original transport mechanism 4 includes a multi-feeding detection sensor 21 that detects multi-feeding of an original transported by the original transport mechanism 4. FIG. 3 is an explanatory diagram that schematically shows a state in which the multi-feeding detection sensor 21 is installed in the original transport mechanism 4. The multi-feeding detection sensor 21 is configured from a light-emitting sensor 21a and a light-receiving sensor 21b, and is used in order to detect the number of pages of originals when originals are transported. That is, light emitted by the light-emitting sensor 21a is transmitted through the transported originals and received by the light-receiving sensor 21b, and the amount of light received is converted to an electrical signal and sent to the control portion 104. In the control portion 104, the number of pages of originals transported is obtained from this signal by computation. Ordinarily, the result of computation is one page, but when multi-feeding occurs, the number of pages of originals simultaneously transported stacked is obtained by computation.

On the upstream side of the main transport path 6 (the portion facing the discharge side of the original tray 1), a lead-in roller 8 and a pair of separation rollers 9 are disposed. As shown in FIG. 2, the lead-in roller 8 is axially supported at the end of a linking arm 10, and the linking arm 10 is axially supported rotatable relative to the axis of the separation rollers 9. Thus, the lead-in roller 8 is supported such that it can rotate around the axis of the separation rollers 9, and such that the lead-in roller 8 can rise/descend. Before an original is placed in the original tray 1, the lead-in roller 8 moves upward, in this state an original is placed in the original tray 1, and the leading edge of the original slides in between the original tray 1 and the lead-in roller 8 and reaches position A. When the lead-in roller 8 moves downward as shown in FIG. 1, the lead-in roller 8 makes contact in the vicinity of the leading edge of the original. Afterward, when the lead-in roller 8 rotates, the original in the original tray 1 is drawn out by the lead-in roller 8, and the original passes between the separation rollers 9 and continues to be transported.

A pair of PS rollers 11 and a transport roller 12 are provided on the downstream side of a merge location B of the main transport path 6 and the sub transport path 7, further downstream a glass platen 13 of the original reading apparatus is provided, and the scanner unit 23 that reads original images is provided below the glass platen 13. Rotation of the PS rollers 11 temporarily stops, the leading edge of the original transported through the separation rollers 9 butts against the PS rollers 11, and the leading edge of the original is aligned parallel to the PS rollers 11. The PS rollers 11 start rotating at the time such that the leading edge of the original reaches the glass platen 13 when reading by the scanner unit 23 begins, starting transport of the original.

With the scanner unit 23, as described below, through the glass platen 13, the original transported in the sub scanning direction on the glass platen 13 is illuminated, and an original image is read by repeating in the main scanning direction, thus reading an entire original image.

A transport roller 14 and a swinging plate 15 are provided downstream of the glass platen 13, a pair of original discharge rollers 16 and the original discharge tray 3 are provided downstream of the swinging plate 15 in the main transport path 6, and a pair of transport rollers 17 and the intermediate tray 2 are provided downstream of the swinging plate 15 in the sub transport path 7. After passing over the glass platen 13, the original is discharged to the original discharge tray 3 via the transport roller 14, the swinging plate 15, and the original discharge rollers 16, or is transported to the intermediate tray 2 via the transport roller 14, the swinging plate 15, and the transport rollers 17.

The swinging plate 15 swings vertically, thus switching and guiding the original, which has passed over the glass platen 13, to either the original discharge tray 3 or the intermediate tray 2. When the original has been guided to the original discharge tray 3 by the swinging plate 15, the original is discharged to the original discharge tray 3 via the original discharge rollers 16. When the original has been guided to the intermediate tray 2 by the swinging plate 15, the original is transported to the intermediate tray 2 via the transport rollers 17, so that the leading edge side of the original is placed in the intermediate tray 2. With a timing such that the trailing edge of the original is sandwiched by the transport rollers 17, the transport rollers 17 are stopped and driven to rotate in reverse, so that the original is transported to the sub transport path 7 via the swinging plate 15. Moreover, the original is transported from the sub transport path 7 to the main transport path 6, reversing the front and back of the original. After the leading edge of the original is aligned parallel to the PS rollers 11, the original passes over the glass platen 13, an image of the back side of the original is read, and then the original is discharged to the original discharge tray 3 via the original discharge rollers 16.

The scanner unit 23 is used to read an image of an original transported by the original feeding apparatus 22. The scanner unit 23 includes a lamp reflector assembly 24, a plurality of reflecting mirrors 25a, 25b, and 25c, an optical lens body 26, and a photoelectric transducer (CCD) 27.

The lamp reflector assembly 24 irradiates light onto an original that passes over the glass platen 13. The reflecting mirrors 25a, 25b, and 25c, as shown by the optical path indicated by the dashed dotted line in FIG. 1, reflect reflected light from the original in the leftward direction in FIG. 1, then reflect that light downward, then reflect that light in the rightward direction in FIG. 1 towards the optical lens body 26.

As an original image reading operation, light is irradiated from a first scanning unit 23a, configured from the lamp reflector assembly 24 and the reflecting mirror 25a, onto the whole of an original that passes over the glass platen 13. The light reflected from this original is reflected by the reflecting mirror 25a, then reflected by the reflecting mirrors 25b and 25c of a second scanning unit 23b configured from the reflecting mirrors 25b and 25c, and then reaches the optical lens body 26. Light that has passed the optical lens body 26 forms an image on the photoelectric transducer 27, and in the photoelectric transducer 27 the reflected light is converted to an electrical signal (original image data). Image data obtained in this manner is sent to the control portion (image processing portion) 104, and after various processing has been performed by the control portion 104, the image data is temporarily stored in a memory of the control portion 104, and the image data in the memory is read according to an output instruction and used in an image forming operation performed by the image forming portion 102.

<Image Forming Portion>

The image forming portion 102 is provided with a laser write unit 31 as an optical beam scanning apparatus and an electrophotographic processing portion 32. The laser write unit 31 irradiates a laser beam onto a surface of a photosensitive drum 33 of the electrophotographic processing portion 32 based on the original image data converted in the photoelectric transducer 27. Specifically, the laser write unit 31 includes a semiconductor laser beam source that irradiates a laser beam corresponding to the image data, a polygon mirror that deflects this laser beam with constant angular velocity, and an fq lens that performs correction such that the laser beam deflected with constant angular velocity scans on the photosensitive drum 33 at a constant velocity, and the like.

The photosensitive drum 33 rotates in the direction shown by the arrow in FIG. 1, and is irradiated with the laser beam from the laser write unit 31 reflected by a turn-back mirror 31a, and thus an electrostatic latent image is formed on the surface of the photosensitive drum 33.

The electrophotographic processing portion 32 is formed with a charging unit 34, a development unit 35, a transfer unit 36, a charge removal unit 37, a release unit, a cleaning unit 38, and a fixing apparatus 39 disposed around the circumference of the photosensitive drum 33. The charging unit 34 charges the surface of the photosensitive drum 33 to a predetermined potential before an electrostatic latent image is formed. The development unit 35 develops an electrostatic latent image formed on the surface of the photosensitive drum 33 into a visible image using toner as image forming material. The transfer unit 36 transfers the toner image formed on the surface of the photosensitive drum 33 to recording paper P. The charge removal unit 37 allows the charge to be removed from the recording paper P after the toner image has been transferred so that the recording paper P is easily released away from the photosensitive drum 33. The cleaning unit 38 removes toner remaining on the surface of the photosensitive drum 33 after toner has been transferred. The fixing apparatus 39 fixes the toner image transferred to the recording paper P onto the recording paper P by applying heat.

Thus, when forming an image on the recording paper P, the surface of the photosensitive drum 33 is charged to a predetermined potential by the charging unit 34, and the laser write unit 31 irradiates a laser beam based on the image data onto the surface of the photosensitive drum 33, thus forming an electrostatic latent image. Afterward, the development unit 35 develops a visible image on the surface of the photosensitive drum 33 using toner, and the transfer unit 36 transfers a toner image to recording paper P fed from the paper transport mechanism portion 103. Afterward, the recording paper P is heated by the fixing apparatus 39, fixing the toner image. On the other hand, toner remaining on the surface of the photosensitive drum 33 is removed by the cleaning unit 38. Thus ends one cycle of the operation for image forming operation (printing operation) onto the recording paper P. By repeating this cycle, it is possible to consecutively form images on a plurality of pages of recording paper P.

<Paper Transport Mechanism Portion>

The paper transport mechanism portion 103 allows image formation to be performed by the image forming portion 102 by transporting, page by page, pages of recording paper P which have been stored in first, second, and third paper feed cassettes 41, 42, and 43, a manual paper feed tray 44, and a large capacity cassette 61 in which a plurality of paper types can be stored in large quantities. The paper transport mechanism portion 103 moreover discharges recording paper P on which an image has been formed to a discharge tray 51. Because the digital copy machine 100 is intended to perform high-speed print processing, the first, second, and third paper feed cassettes 41, 42, and 43 are configured to be able to store 500 to 1500 pages each of standard sizes of recording paper.

Also, the paper transport mechanism portion 103 is provided with a duplex copy unit 45 for, after temporarily recovering recording paper P on which an image has been formed on one side, allowing image formation to be performed on the other side by the image forming portion 102. The duplex copy unit 45 is configured to be exchangeable with an ordinary paper feed cassette, allowing an increase in the total number of paper feed cassettes that can be loaded in the digital copy machine 100.

Recording paper P of different sizes is stored in the paper feed cassettes 41, 42, and 43 respectively. Recording paper P is drawn out in order page by page from the paper feed cassette in which recording paper P of a user's desired size is stored, and transported to the image forming portion 102 via the transport path 40.

The transport path 40 of the paper transport mechanism portion 103 includes a main transport path 46 and a switchback transport path 47. One end (the upstream end in the recording paper transport direction) of the main transport path 46 is branched and faces the discharge side of each of the paper feed cassettes 41, 42, and 43, the manual paper feed tray 44, and the large capacity cassette 61, and the other end (the downstream end in the recording paper transport direction) of the main transport path 46 faces a finishing apparatus 50 provided with the discharge tray 51 to which recording paper P is discharged via the transfer unit 36 and the fixing apparatus 39.

In the finishing apparatus 50, a mechanism is incorporated with which post processing such as staple processing can be performed, and a mechanism is incorporated for raising/lowering the discharge tray 51 to which recording paper P is discharged in order to switch the discharge tray 51. Also, in the finishing apparatus 50, a mechanism is incorporated that shifts, i.e. moves, the discharge tray 51 in the direction perpendicular to the discharge direction of the recording paper P, in order to change the discharge position of recording paper P discharged to the discharge tray 51 in the direction perpendicular to the discharge direction of the recording paper P. Thus, it is possible to change the discharge position of recording paper P discharged to the discharge tray 51 in the direction perpendicular to the discharge direction of the recording paper P.

One end (the upper end in FIG. 1) of the switchback transport path 47 is connected to the main transport path 46 on the downstream side (the left side in FIG. 1) of the position where the fixing apparatus 39 is disposed, and the intermediate portion (the center portion in the vertical direction in FIG. 1) of the switchback transport path 47 is branched into branch paths 47A and 47B. The first branch path 47A is extended vertically downward. On the other hand, one end of the second branch path 47B faces the carry-in side of the duplex copy unit 45.

First and second branch catches 47a and 47b are respectively provided in the portion where the main transport path 46 connects with the switchback transport path 47 and the branched portion of the switchback transport path 47.

The first branch catch 47a is rotatable around a horizontal shaft between a first position where the first branch catch 47a closes the switchback transport path 47, and a second position where the first branch catch 47a closes the discharge side of the main transport path 46 and causes the main transport path 46 and the switchback transport path 47 to be in communication with each other. When the first branch catch 47a is in the first position, recording paper P that has passed through the image forming portion 102 is discharged as-is to the discharge tray 51. On the other hand, when the first branch catch 47a is in the second position, recording paper P that has passed through the image forming portion 102 is fed to the switchback transport path 47.

The second branch catch 47b is rotatable around a horizontal shaft between a first position where the second branch catch 47b opens the first branch path 47A of the switchback transport path 47 and closes the second branch path 47B, and a second position where the second branch catch 47b opens the second branch path 47B and closes the first branch path 47A. When the second branch catch 47b is in the first position, recording paper P transported to the switchback transport path 47 is guided to the first branch path 47A, and is transported to the lower end position of the first branch path 47A. Afterward, when the second branch catch 47b changes to the second position and the transport direction of the recording paper P is reversed, the recording paper P is fed to the duplex copy unit 45 by being transported to the second branch path 47B via the branched portion. That is, because the recording paper P is fed to the duplex copy unit 45 via the first branch path 47A and the second branch path 47B, the top and bottom of the recording paper P are reversed when the recording paper P has been fed to the image forming portion 102, so that it is possible to form an image on the back face of the recording paper P.

Thus, when simplex copying is performed by the digital copy machine 100, the first branch catch 47a is in the first position, and after an image is formed by the image forming portion 102 on recording paper P drawn out from the paper feed cassettes 41, 42, and 43, the manual paper feed tray 44, or the large capacity cassette 61, the recording paper P is discharged as-is to the discharge tray 51.

On the other hand, when duplex copying is performed, first, the first branch catch 47a is in the second position, and the second branch catch 47b is in the first position. Thus, recording paper P that has been drawn out from the paper feed cassettes 41, 42, and 43, the manual paper feed tray 44, or the large capacity cassette 61, and on which an image has been formed on one side by the image forming portion 102, is guided to the first branch path 47A of the switchback transport path 47. Afterward, the second branch catch 47b changes to the second position and the transport direction of the recording paper P is reversed, and the recording paper P is fed to the duplex copy unit 45 from the second branch path 47B via the branch portion. When forming an image on the other side of the recording paper P, the first branch catch 47a changes to the first position, an image is formed by the image forming portion 102 on the recording paper P drawn out from the duplex copy unit 45, and then the recording paper P is discharged to the discharge tray 51.

Pickup rollers 48 are disposed on the upstream ends (the portions facing the discharge sides of the paper feed cassettes 41, 42, and 43, the manual paper feed tray 44, the duplex copy unit 45, and the large capacity cassette 61 of the main transport path 46). A plurality of feed rollers 49 for feeding drawn out recording paper P to the main transport path 46 are provided on the downstream sides of the pickup rollers 48. Due to rotation of the pickup rollers 48 and the feed rollers 49, recording paper P stored in the paper feed cassettes 41, 42, and 43, the manual paper feed tray 44, and the large capacity cassette 61 can be selectively fed page by page to the main transport path 46.

<Addressing Multi-Feeding when Transporting Originals>

In the digital copy machine 100 according to the above first embodiment, in order to improve processing speed, while reading originals with the scanner portion 101, images are recorded on recording paper P with the image forming portion 102 and then that recording paper P is discharged to the discharge tray 51 of the finishing apparatus 50. That is, reading of originals and recording to recording paper P are performed simultaneously in parallel. So, when multi-feeding of an original occurs in the original transport mechanism 4 of the scanner portion 101, the multi-fed original cannot be read, and therefore the image written on the multi-fed original is not recorded to recording paper P. Accordingly, recording paper P on which the image written on the multi-fed original is recorded is not present among the recording paper P to be discharged to the discharge tray 51, but rather is in a missing state. After recording of all of the other images is finished, reading of the multi-fed originals is performed again, the read originals are recorded to recording paper P, and then the recording paper P is discharged to the discharge tray 51 of the finishing apparatus 50. Thus, in this case, it is necessary to arrange pages after all recording is finished.

So, in the above case in which multi-feeding has occurred, in the above digital copy machine 100, a configuration is adopted that facilitates work to arrange pages of recording paper P that have been discharged, which is a feature of the present invention. Following is a description of this aspect of the present invention. With the above digital copy machine 100, it is possible to read an original that has an image written on both the front and back faces, but here, a case is described in which a simplex original with an image written only on the front face is used. Also, in the first embodiment, a case is described in which the image written on a one-page original is recorded on one sheet of recording paper P, which is the standard mode of the digital copy machine 100. In this case, the above digital copy machine 100 corresponds to the aforementioned single-page original single-page recording image processing apparatus.

A data map as shown in FIG. 4 is provided in the memory of the control portion 104 of the digital copy machine 100. In this data map, information related to each page of originals read by the scanner portion 101 of the digital copy machine 100 is recorded. "Original page number (PA)", "image data storage area", "image present", "multi-feeding", "processing finished confirmation", and "shift necessary" are used as items in the data map.

The "original page number (PA)" is the page number of the original read by the scanner portion 101 of the digital copy machine 100. The "image data storage area" is the area in which the image written on the original is stored after reading.

The "D(number)" in the "image data storage area" indicates the image written on this page number of original. "Image present" indicates whether or not an image read from the original is present in the "image data storage area", and a circle indicates that an image is present. "Multi-feeding" is information indicating whether or not multi-feeding has occurred when transporting each original for reading by the scanner portion 101 of the digital copy machine 100, and a circle indicates that there is multi-feeding. "Processing finished confirmation" is information that indicates whether or not processing for reading of each original is finished, and a circle indicates that processing is finished. "Shift necessary" indicates whether or not, when recording paper P on which the image written on the original is recorded is discharged to the discharge tray 51, it is necessary to discharge that recording paper P to a different discharge position than the other recording paper P by shifting the discharge tray 51. A circle indicates that shifting is necessary.

In the above data map, each time an original is transported by the scanner portion 101 of the digital copy machine 100, a line is generated with the original page number (PA) of the transported original, and information is entered in that line. The line with the original page number (PA) is referred to as a PA line, and specifically, for example, a PA line in which the original page number (PA) is 2 is referred to as a line PA 2. Also, when multi-feeding of originals occurs, PA lines are generated with the original page numbers (PA) of all of the multi-fed originals, and information is entered in those lines. In the following description, an example is given in which there are 10 pages of originals, and of those, the pages six and seven have been multi-fed, and FIG. 4 shows the state in the case of this example. Also, in the present embodiment, when multi-feeding occurs, original reading is instructed to be performed again after the initial original reading finishes, but FIG. 4 shows the state after initial original reading has finished and before original reading is performed again.

Figure 5:
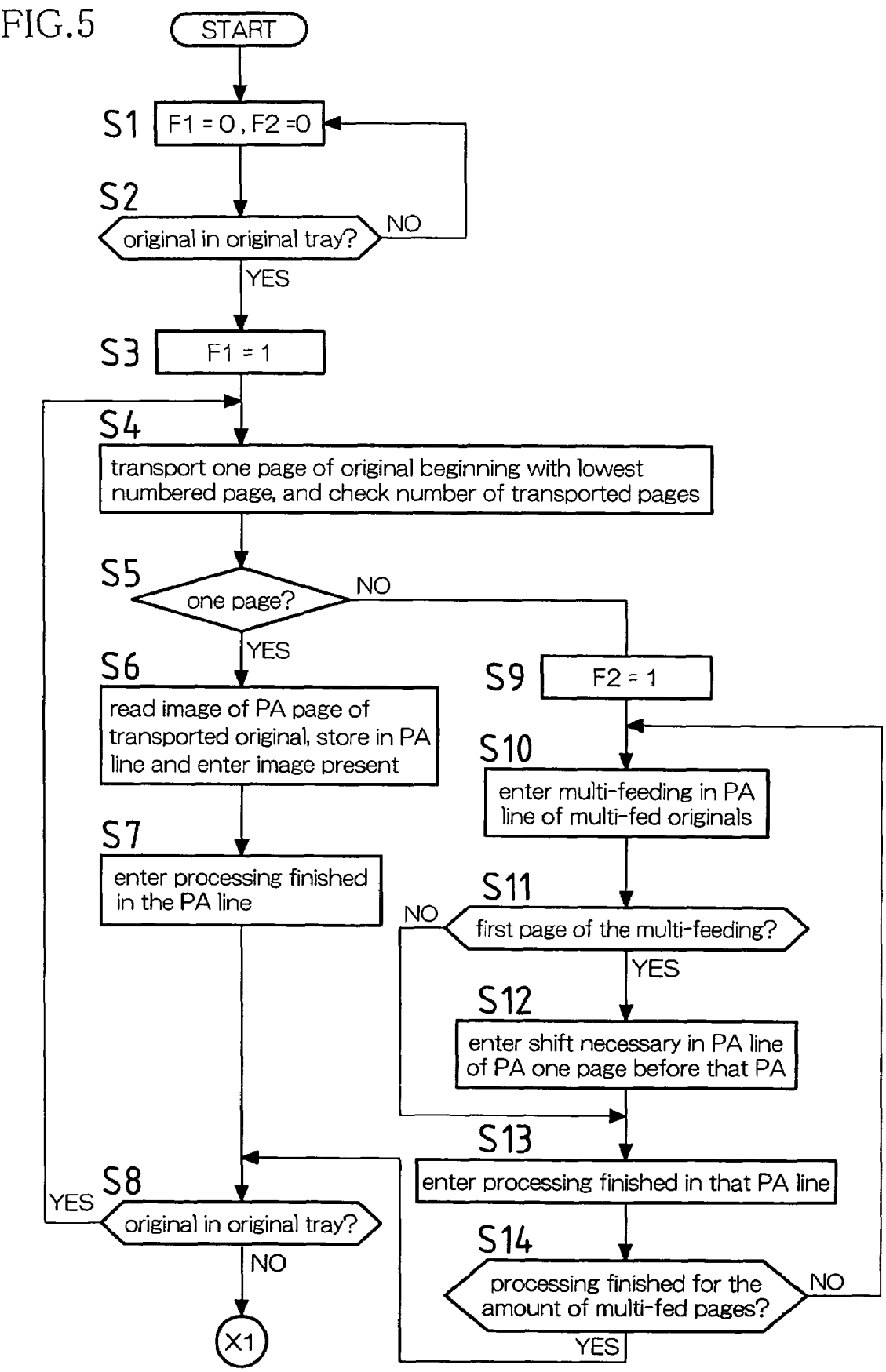
FIG. 5 is a flowchart (part 1) showing an original reading operation in the digital copy machine according to the first embodiment.
Figure 6:
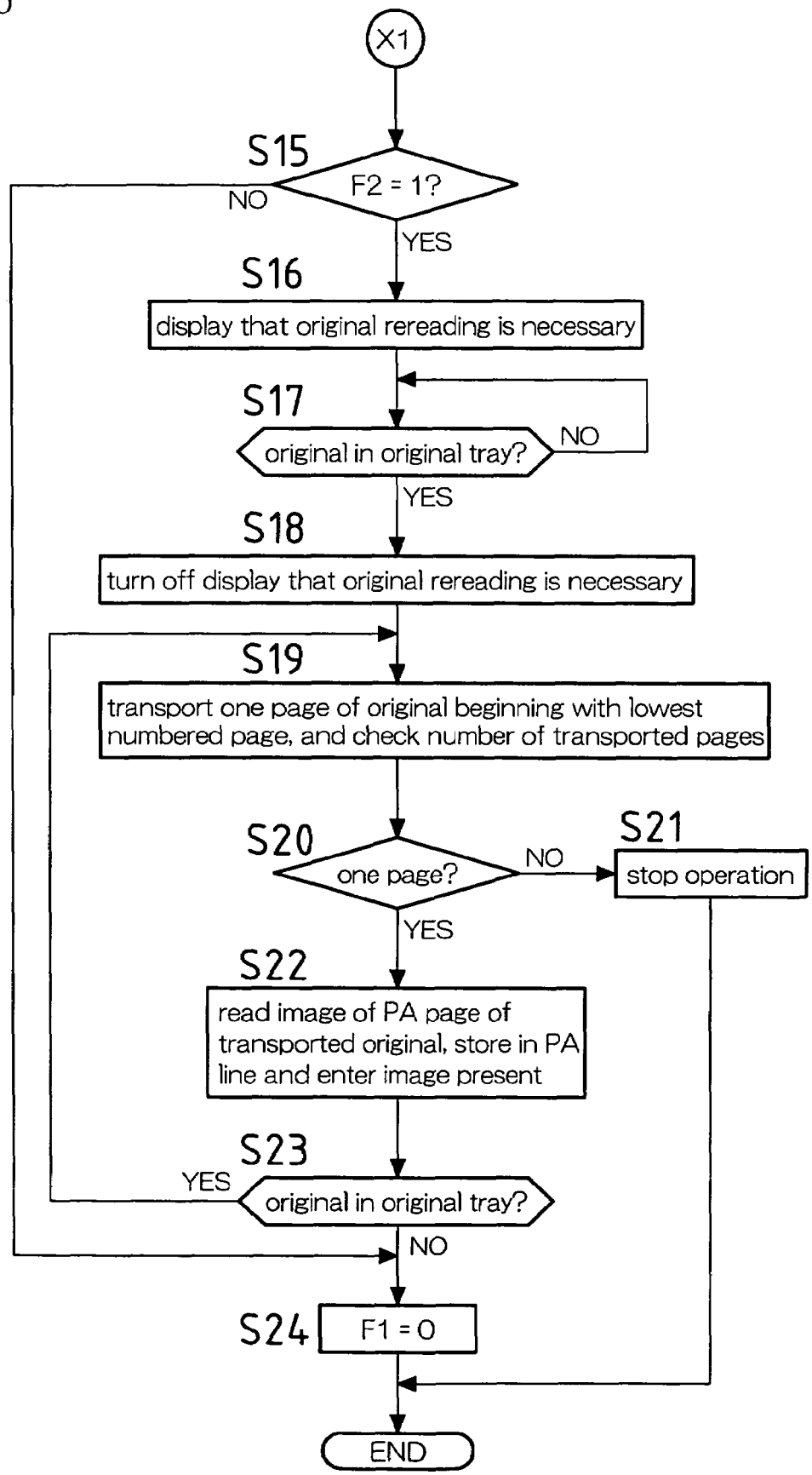
FIG. 6 is a flowchart (part 2) showing the original reading operation in the digital copy machine according to the first embodiment.
Figure 7:
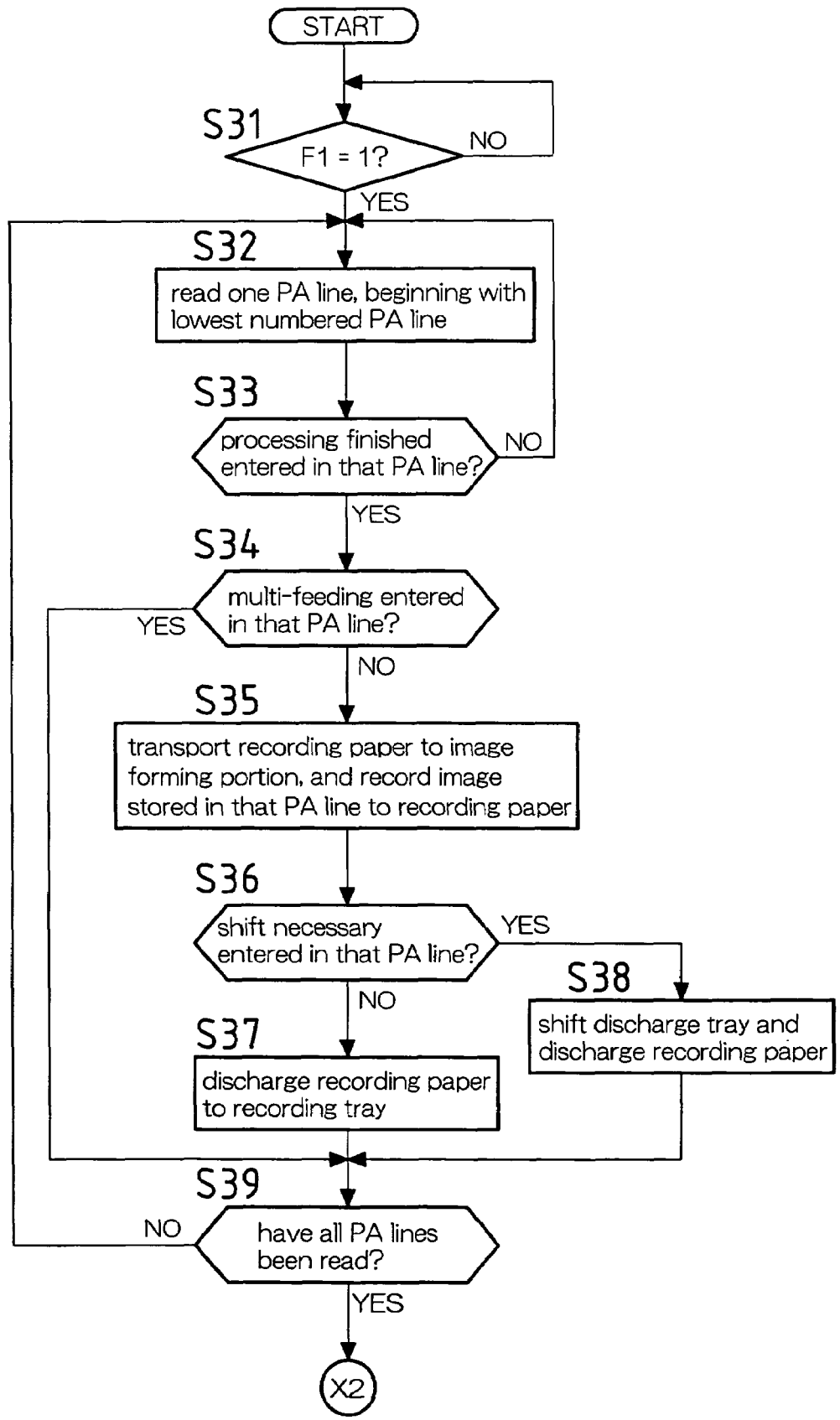
FIG. 7 is a flowchart (part 1) showing recording paper recording and discharge operations in the digital copy machine according to the first embodiment.
Figure 8:
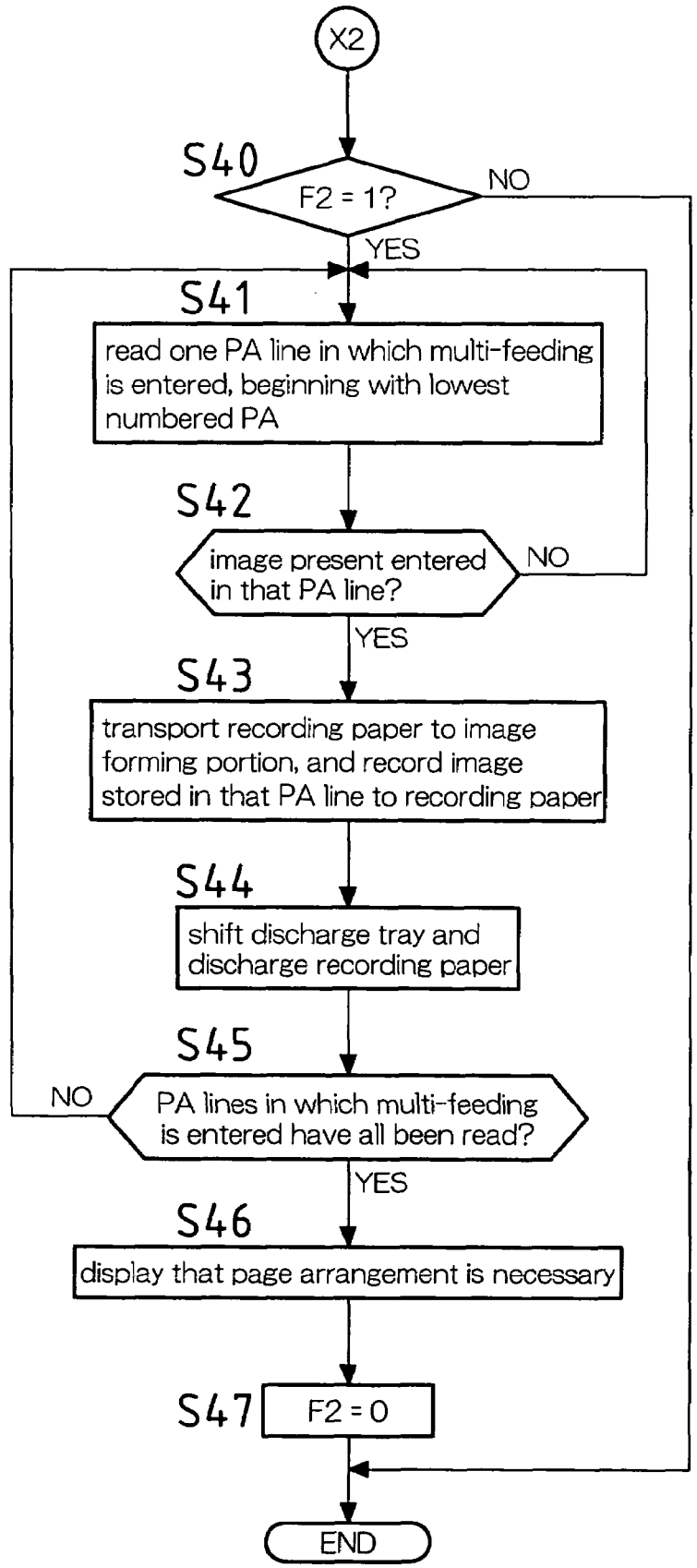
FIG. 8 is a flowchart (part 2) showing the recording paper recording and discharge operations in the digital copy machine according to the first embodiment.

Next is a description of an original reading operation, and recording paper P recording and discharge operations, in the digital copy machine 100 using the above data map. FIGS. 5 and 6 are flowcharts showing the original reading operation in the digital copy machine 100 according to the first embodiment, and FIGS. 7 and 8 are flowcharts showing recording paper P recording and discharge operations in the digital copy machine 100. The flow of the original reading operation shown in FIGS. 5 and 6, and the flow of the recording paper P recording and discharge operations shown in FIGS. 7 and 8, proceed approximately simultaneously in parallel, in order for original reading and recording to recording paper P to be performed simultaneously in parallel. Also, these operations are performed by cooperative operation of the aforementioned hardware and software of the control portion 104.

First is a description of the original reading operation. In the original reading operation, a reading start flag F1 and a multi-feed flag F2 are used as control flags. The reading start flag F1 indicates that the digital copy machine 100 has started original reading, and the multi-feed flag F2 indicates that multi-feeding has occurred during transport of originals.

In FIGS. 5 and 6, initially, after resetting the reading start flag F1 and the multi-feed flag F2 (F1=0, F2=0)(Step S1), a check is performed of whether or not an original is in the original tray 1, that is, whether or not an original has been placed in the original tray 1 (Step S2). When an original is placed in the original tray 1 by an operator or the like of the digital copy machine 100 (Step S2), the reading start flag F1 is set (F1=1)(Step S3).

Next, in order to read the images written on the originals with the scanner portion 101 of the digital copy machine 100, the originals are transported in order page by page, and at this time the number of pages of transported originals is checked (Step S4). As described above, when an original is properly transported, the number of transported pages is one page, but when multi-feeding occurs, the number of transported pages is a plurality of pages, and as described above, the number of pages of originals multi-fed simultaneously is obtained by computation. The originals multi-fed simultaneously correspond to the aforementioned multi-fed originals.

So, when it is determined from the check in Step S4 that the number of pages of transported originals is one page (Step S5), the original is being properly transported, and so the image of the original read by the scanner unit 23 is stored in the "image data storage area" of the PA line corresponding to the PA page of the transported original in the data map, and after entering image present in the "image present" column (Step S6), processing finished is entered in the "processing finished confirmation" column (Step S7). PA lines 1 to 5 and PA lines 8 to 10 in the data map in FIG. 4 correspond to the PA lines of the data map entered by the processing of Steps S6 and S7 in the above example.

When it is determined from the check in Step S4 that the number of pages of transported originals is not one page (Step S5), multi-feeding has occurred, so the multi-feed flag F2 is set (F2=1)(Step S9). Then, multi-feeding is entered in the "multi-feeding" column of the PA line corresponding to the PA page of the multi-fed originals in the data map provided in the control portion 104 (Step S10).

Multi-feeding is a state in which a plurality of pages of originals is transported stacked together. So, next a check is performed of whether or not the PA page is the first page of the plurality of pages of originals in the multi-feeding (Step S11), and if the PA page is the first page, shift necessary is entered in the "shift necessary" column of the PA line of the data map corresponding to the PA prior (one page prior) to that PA (Step S12). Then, processing finished is entered in the "processing finished confirmation" column of that PA line in the data map (Step S13).

When the processing in Step S13 finishes, a check is performed of whether or not the above processing is finished for the number of pages multi-fed (Step S14), and if that processing is not finished, processing returns to Step S10 and the above processing is repeated. However, if not the first page in the multi-feeding, that is, if the second or subsequent page (Step S11), after the processing in Step S10, the processing in Step S13 is immediately performed without performing the processing in Step S12.

In the above example, the page six and seven of originals are multi-fed, so multi-feeding is entered in the "multi-feeding" column of PA line 6 in the data map in FIG. 4 (Step S10). Also, because page six of originals is the first page of the plurality of pages of originals in the multi-feeding (Step S11), after entering shift necessary in the "shift necessary" column of PA line 5 in the data map in FIG. 4 corresponding to page five of originals, which is one page before page six (Step S12), processing finished is entered in the "processing finished confirmation" column of PA line 6 (Step S13). Also, because page seven of originals is also multi-fed, the same processing is performed, but the processing in Step S12 is not performed because page seven of originals is not the first page of the plurality of pages of originals in multi-feeding.

Accordingly, in the above example, PA lines 6 and 7 in the data map in FIG. 4 correspond to the PA lines in which information has been entered by the processing in above Steps S10 to S13. Also, PA line 5 corresponds to the PA line in which information has been entered by the processing in Step S12.

When the processing in Step S7 is finished in the case that originals have been properly transported, or when the processing in Steps S10 to S13 for a plurality of multi-fed pages is finished in the case that multi-feeding occurred, a check is performed of whether or not an original remains in the original tray 1 without being transported, that is, whether or not there is an original in the original tray 1 (Step S8). When there is an original, the flow of processing returns to Step S4, and the above processing is repeated. When transport of all of the originals is finished, that is, when there are no more originals in the original tray 1 (Step S8), the flow of processing proceeds to Step S15.

In Step S15, a check is performed of whether or not the multi-feed flag F2 is set, and if the multi-feed flag F2 is not set, multi-feeding has not occurred, and transport and reading of originals is being performed properly, so the reading start flag F1 is reset (Step S24) and then the original reading operation of the digital copy machine 100 is finished.

In Step S15, if the multi-feed flag F2 is set, multi-feeding has occurred, so a display that original rereading is necessary is performed in the display portion 105 (Step S16). In this case, it is necessary to reread the multi-fed originals, so the multi-fed originals are again placed in the original tray 1 by an operator or the like of the digital copy machine 100. Then, a check is performed of whether or not an original for which rereading is necessary is placed in the original tray 1, that is, whether or not there is an original in the original tray 1 (Step S17), and when an original is placed in the original tray 1, the display that original rereading is necessary in the display portion 105 is turned off (Step S18), originals are transported page by page in the page order in which they were placed in the original tray 1, and a check is performed of the number of pages transported (Step S19). If the number of pages is not one page (Step S20), it is deemed that multi-feeding has occurred again and thus there is a problem with adjustment of the original transport mechanism 4 of the digital copy machine 100, and so operation of the digital copy machine 100 is stopped (Step S21).

If the number of pages transported in Step S16 is one page, original transport is proper, so original reading is performed, the read image is stored in the empty "image data storage area" column of the PA line corresponding to the PA page of the original, and image present is entered in the likewise empty "image present" column (Step S22). In the above example, the sixth and seventh pages of originals are multi-fed pages, and will be reread, so (*1) in PA lines 6 and 7 in the data map in FIG. 4 corresponds to those pages.

When the processing in Step S22 finishes, a check is performed of whether or not an original that has not yet been transported remains in the original tray 1, that is, whether or not there is an original in the original tray 1 (Step S23), and if there is an original in the original tray 1, the flow of processing returns to Step S19 and the above processing is repeated. When transport of all of the originals finishes, that is, when there is not an original in the original tray 1 (Step S23), the reading start flag F1 is reset (Step S24), and then the original reading operation of the digital copy machine 100 ends.

Next is a description of the recording paper P recording and discharge operations in the digital copy machine 100. In the recording paper P recording and discharge operations, same as in the original reading operation, the reading start flag F1 and the multi-feed flag F2 are used as control flags.

In FIGS. 7 and 8, in the recording paper P recording and discharge operations it is assumed that the reading operation has been performed. So, first, a check is performed of whether or not the digital copy machine 100 has started the reading operation, that is, whether or not the reading start flag F1 is set (Step S31), and if the reading start flag F1 is set, original reading has started in the digital copy machine 100, so the flow of the operation to record read images to recording paper P, and the operation to discharge recording paper P on which an image has been recorded, is started.

The data of one PA line is read from the data map beginning with the lowest numbered PA line (Step S32), and then a check is performed of whether or not processing of the data of the read PA line is finished, that is, whether or not processing finished is entered in the "processing finished confirmation" column of that PA line (Step S33). The reason for this is that, as described above, because original reading and recording to recording paper P are performed simultaneously in parallel, when recording to recording paper P, it is necessary to confirm that reading of an original whose image is to be recorded is finished.

If processing of the data of that PA line is finished (Step S33), next, a check is performed of whether or not the page of the original corresponding to that PA line is a multi-fed page, that is, whether or not multi-feeding is entered in the "multi-feeding" column of that PA line (Step S34). If the page is a multi-fed page, it is not necessary to record an image of the original corresponding to that PA line onto recording paper P, and so the flow of processing proceeds to Step S39.

In the above example, multi-feeding is entered in the "multi-feeding" column of PA lines 6 and 7, and so the images written on the sixth and seventh pages of originals corresponding to PA lines 6 and 7 are not recorded onto recording paper P at this stage, and recording paper P is not discharged.

If the page of the original corresponding to that PA line is not a multi-fed page (Step S34), recording paper P is transported from a paper feed cassette to the image forming portion 102, and the image stored in the "image data storage area" of that PA line in the data map is recorded onto recording paper P (Step S35). PA lines 1 to 5 and PA lines 8 to 10 in the data map in FIG. 4 correspond to that PA line in the above example. Further, a check is performed of whether or not shift necessary is entered in the "shift necessary" column of that PA line in the data map (Step S36), and if shift necessary is not entered, after the recorded recording paper P is transported to the finishing apparatus 50, the recording paper P is discharged as-is to the discharge tray 51 (Step S37), and the flow of processing advances to Step S39.

Figure 9A:
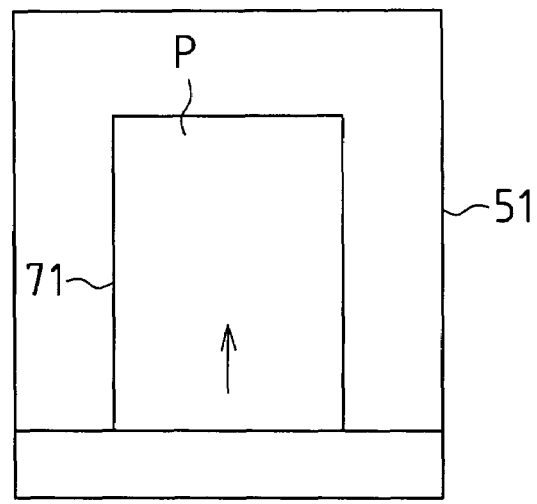
FIGS. 9(a) to 9(d) are plan views showing recording paper discharge positions on a discharge tray of the digital copy machine according to the first embodiment.

FIGS. 9(a) to 9(d) show, viewing the discharge tray 51 from above, a state in which recording paper P has been discharged to the discharge tray 51 in the first embodiment. The arrow in FIGS. 9(a) to 9(d) indicates the discharge direction of the recording paper P. FIG. 9(a) shows a state in which, in the case of the above example, recording paper P has been discharged to the discharge tray 51 in Step S37. The recording paper P is discharged to a standard discharge position 71 in the discharge tray 51.

If shift necessary is entered in the "shift necessary" column of the above PA line (Step S36), when the recorded recording paper P has been transported to the finishing apparatus 50, first, processing is performed in which the recording paper P is discharged after shifting the discharge tray 51 to the left in the direction perpendicular to the discharge direction of the recording paper P, and after discharge the discharge tray 51 is again returned to its original position (Step S38). That is, this sort of recording paper P, on which is recorded the image written on the PA page of the original corresponding to the PA line in which shift necessary is entered in the "shift necessary" column, corresponds to the aforementioned pre-multi-feeding original recording paper.

The pre-multi-feeding original recording paper, when discharged to the discharge tray 51, is discharged to a different discharge position than other recording paper, as described above. Due to multi-feeding when transporting originals, the image of an original is not recorded onto recording paper P, but is recorded afterward, so it is necessary to arrange pages. The different discharge position is used as a mark such that when arranging pages, it is possible to easily insert, by hand, recorded recording paper P at its proper position between pages of recording paper P that was previously recorded.

Figure 9B:
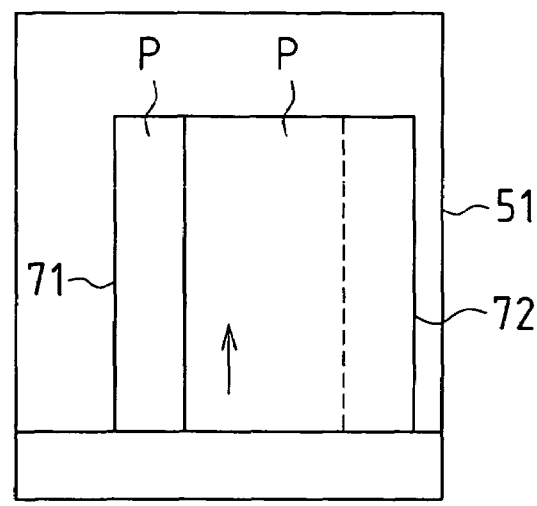

In the above example, shift necessary is entered in the "shift necessary" column of PA line 5, and the recording paper P on which the image of page five of originals is recorded, that is, page five of recording paper P corresponding to PA line 5, is pre-multi-feeding original recording paper, and thus is discharged to a different discharge position in the discharge tray 51 than other recording paper. FIG. 9(b) shows, in the case of the above example, a state in which page five of recording paper P, which is pre-multi-feeding original recording paper, has been discharged to the discharge tray 51 in Step S38, and the recording paper discharged in Step S38 is positioned at a shifted discharge position 72, which is nearer to the right side than the position of other recording paper P.

When the processing in Step S38 finishes as described above, the flow of processing proceeds to Step S39. In Step S39, a check is performed of whether or not the data of all of the PA lines in the data map has been read, and if the data of all of the PA lines in the data map has not been read, the flow of processing returns to Step S32, and the above processing is repeated.

Figure 9C:
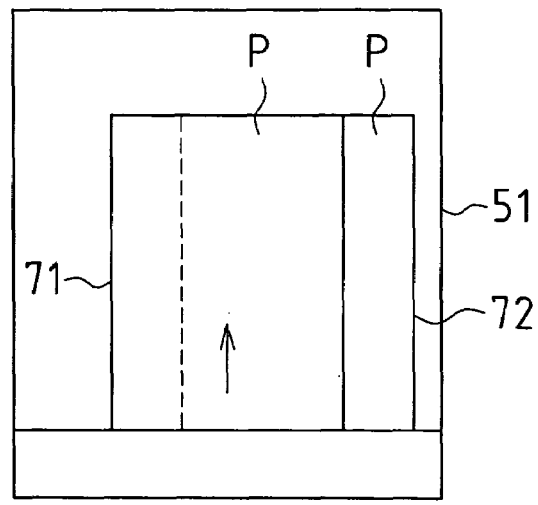

FIG. 9(c) shows, in the case of the above example, the discharge state of recording paper P after being discharged to the discharge tray 51 in Step S38. This recording paper P is discharged to the standard discharge position 71 in the discharge tray 51. In this state, only the pre-multi-feeding original recording paper, which is recording paper P that was previously discharged in Step S38, is positioned at the shifted discharge position 72 in the discharge tray 51, protruding to the right side.

If the data of all of the PA lines in the data map have been read in Step S39, the flow of processing proceeds to Step S40. In Step S40, a check is performed of whether or not the multi-feed flag F2 is set, and if the F2 flag is not set, multi-feeding has not occurred when transporting originals, and recording to recording paper P and discharge are all finished, so processing is finished.

In Step S40, when the multi-feed flag F2 is set, multi-feeding has occurred when transporting originals, and the multi-fed originals will be reread, so it is necessary to record the images of the reread originals to recording paper P. So, the data of one PA line in which multi-feeding is entered in the "multi-feeding" column is read from the data map beginning with the lowest numbered PA (Step S41), and then a check is performed of whether or not there is recording of an image in the read data, that is, whether or not there is an entry of image present in the "image present" column of the PA line (Step S42). If there is not an image present entry, reading of an image from that PA original is not finished, so the flow of processing waits until reading finishes, and after reading of the image is finished, the recording paper P is transported from a paper feed cassette to the image forming portion 102, and the image stored in the "image data storage area" of the that PA line in the data map is recorded to recording paper P (Step S43).

In the above example, multi-feeding is entered in the "multi-feeding" column of PA lines 6 and 7 in the data map in FIG. 4, so an image of pages six and seven of originals is recorded to recording paper P by the processing in Step S43.

This recording paper P is the aforementioned multi-fed original recording paper.

When the multi-fed original recording paper recorded in Step S43 is transported to the finishing apparatus 50, the multi-fed original recording paper is discharged with the discharge tray 51 shifted in the direction perpendicular to the discharge direction of the recording paper P, and after discharge the discharge tray 51 is again returned to its original position (Step S44). In this manner, due to this processing, the multi-fed original recording paper, on which a reread image is recorded, is discharged to a different discharge position in the discharge tray 51 than other recording paper. This is so that it is possible for an operator or the like of the digital copy machine 100 to easily distinguish the multi-fed original recording paper on which a reread image is recorded from other recording paper.

Figure 9D:
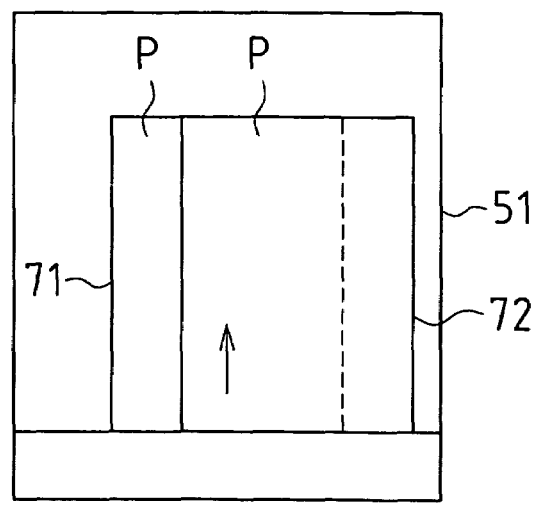

FIG. 9(d) shows, in the case of the above example, a state in which recording paper P has been discharged to the discharge tray 51 in Step S44. The multi-fed original recording paper, on which images of pages six and seven of originals have been recorded, is positioned at the shifted discharge position 72, which is nearer to the right side than the position of other recording paper P.

When the processing in Step S44 finishes, a check is performed of whether or not all of the PA data in the data map has been read (Step S45), and if all of the PA data in the data map has not been read, the flow of processing returns to Step S41, and the above processing is repeated. If all of the PA data in the data map has been read (Step S45), after a display that it is necessary to rearrange the pages of recording paper P that have been recorded is performed in the display portion 105 (Step S46), the multi-feed flag F2 is reset (Step S47), and then the recording paper P recording and discharge operations in the digital copy machine 100 are finished.

According to the first embodiment described above, when multi-feeding is detected during transport of originals, only pre-multi-feeding original recording paper, which is recording paper on which is recorded the image written on the original transported immediately before the original initially transported among the multi-fed originals, is discharged to a different discharge position in the discharge tray than other recorded recording paper. Thus, the pre-multi-feeding original recording paper can easily be discerned from the other recorded recording paper. The place between the pre-multi-feeding original recording paper and the recorded recording paper discharged immediately after the pre-multi-feeding original recording paper is where the recording paper recorded with the image written on the multi-fed originals would properly be expected to be if there were no multi-feeding. Accordingly, it is easy for an operator or the like of the image processing apparatus to find the location to insert the recording paper on which the images written on the multi-fed originals is recorded.

Also, when multi-feeding is detected during transport of originals, a display is performed that it is necessary to reread the multi-fed originals, so it is possible to prompt an operator or the like of the image processing apparatus to reread the multi-fed originals. Also, all of the multi-fed original recording paper is discharged to a different discharge position in the discharge tray than the other recorded recording paper that is already discharged, except for the pre-multi-feeding original recording paper. Accordingly, it is easy for an operator or the like of the image processing apparatus to find the multi-fed original recording paper, on which the images written on the multi-fed originals are recorded.

Also, in order to arrange the page numbers of the recorded recording paper, a display that it is necessary to arrange the page numbers of the recorded recording paper is performed after recording finishes for the multi-fed original recording paper. Accordingly, when multi-feeding has been detected during transport of originals, an operator or the like of the image processing apparatus can easily be made aware that it is necessary to arrange the page numbers of the recorded recording paper.

In the first embodiment described above, when the number of sets recorded is one set, or alternatively, in the case of the first set when the number of sets recorded is a plurality of sets, in order to increase the processing speed, original reading and recording to recording paper are performed simultaneously in parallel. So, when multi-feeding has occurred, by performing the processing as described above, the images written on the multi-fed originals are recorded to recording paper after finishing all of the recording to recording paper of images written on properly transported originals. Thus, as described above, it becomes necessary to rearrange the pages of recording paper.

However, in the case of the remaining sets other than the first set when the number of sets recorded is a plurality of sets, even assuming that multi-feeding has occurred when transporting originals, when recording the second set, images of all of the originals have been read, so it is possible to record the images written on the originals to recording paper according to the page order of the originals. Accordingly, in this case, it is not necessary to rearrange the pages of recording paper.

So, if sacrificing somewhat of the improvement in processing speed, a system is adopted in which the images written on the originals are recorded to recording paper after images of all of the originals have been read, and the images are recorded to recording paper after images of all of the originals have been read and obtained by rereading even when multi-feeding has occurred, it is possible to eliminate the need to rearrange the pages of recording paper.

Also, in the first embodiment described above, when multi-feeding has been detected during transport of originals, instead of a display that it is necessary to arrange the page numbers of the recorded recording paper performed after recording of the multi-fed original recording paper is finished, a display may be performed that it is necessary to insert the multi-fed original recording paper between the pre-multi-feeding original recording paper and the recorded recording paper discharged immediately after the pre-multi-feeding original recording paper. By doing so, it is possible to easily make an operator or the like of the image processing apparatus aware that it is necessary to insert the multi-fed original recording paper, which is recording paper on which the images written on the multi-fed originals are recorded, in the place where the recording paper on which the images of the multi-fed originals are recorded is missing, which is where the multi-fed original recording paper would properly be expected to be if there were no multi-feeding.

Second Embodiment

Figure 10A:
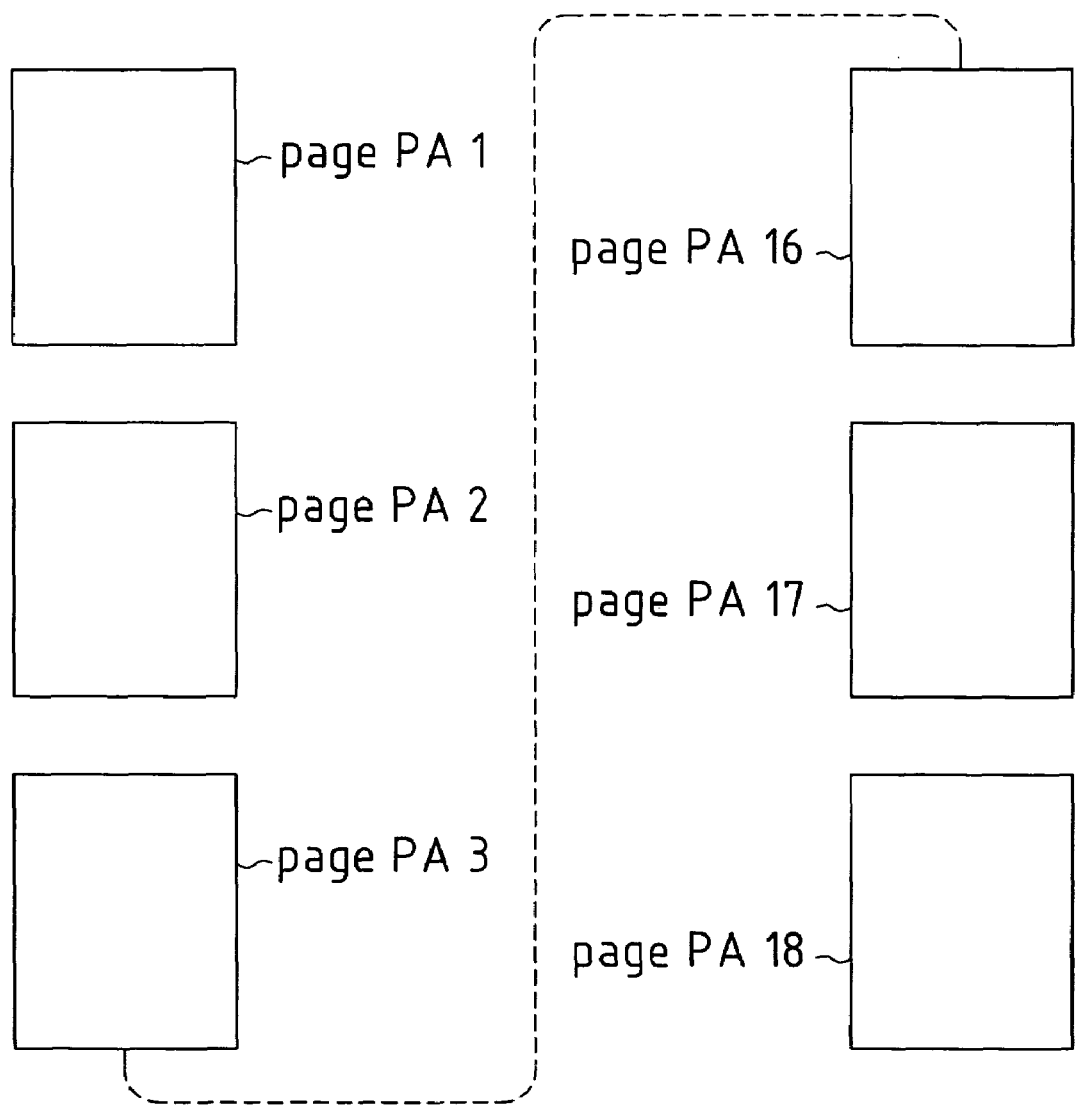
FIG. 10(a) is an explanatory diagram showing the arrangement of originals used in a digital copy machine according to a second embodiment.
Figure 10B:
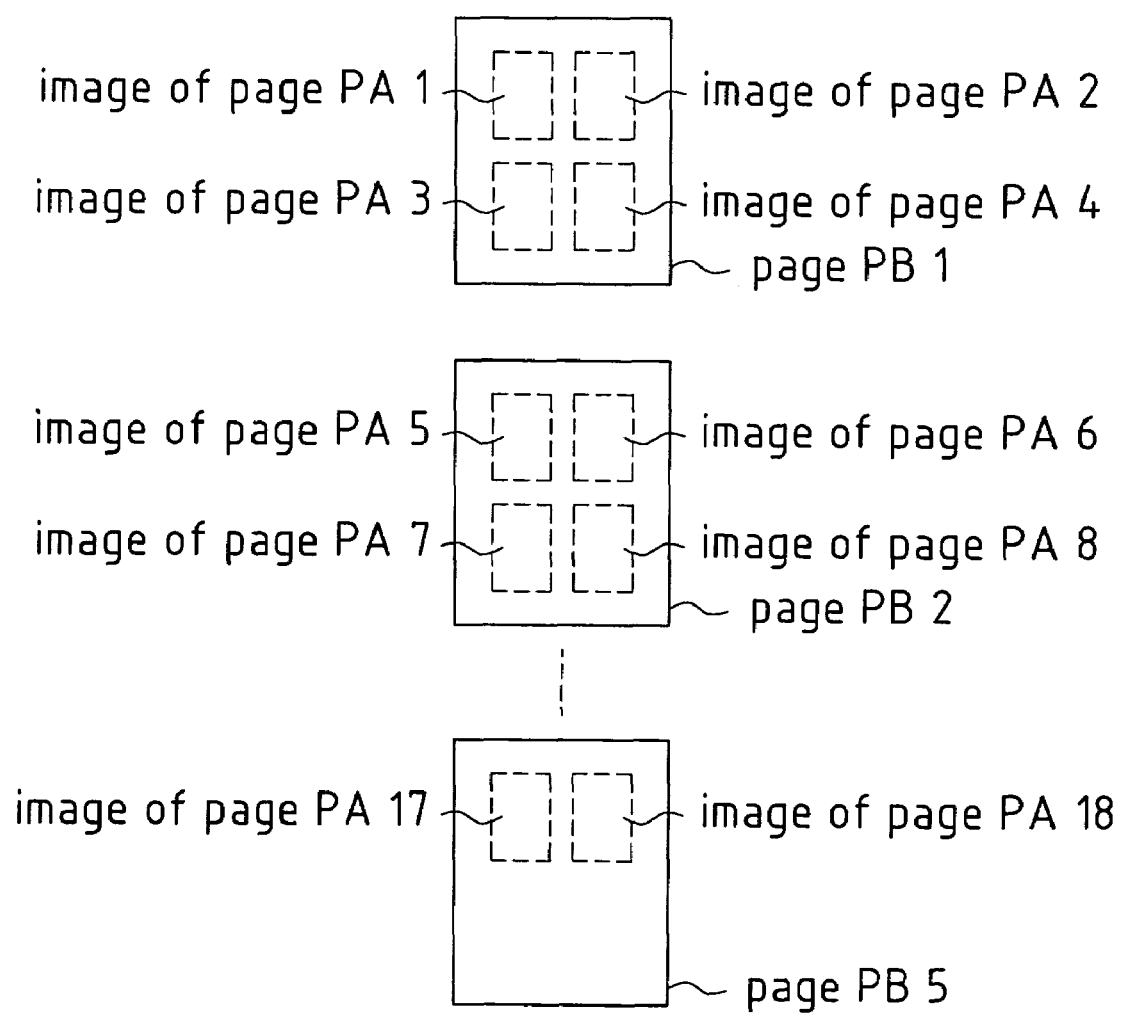
FIG. 10(b) is an explanatory diagram showing the arrangement of recording paper.

In the second embodiment, same as in the first embodiment, the above digital copy machine 100 is used. Also, in the second embodiment as well, a case is described in which a simplex original is used, which has an image written only on the front face. The second embodiment differs from the first embodiment in that, for example, as shown in FIG. 10(a), images written on a plurality of successive pages of originals are, as shown in FIG. 10(b), recorded together on one page of recording paper P. That is, in the second embodiment, a special mode of the digital copy machine 100 is used in which images written on a plurality of pages of originals are recorded together on one page of recording paper P. In this case, the above digital copy machine 100 corresponds to the aforementioned multi-page original single-page recording image processing apparatus. Here, an example is described in which, as shown in FIG. 10(b), images written on four pages of originals are recorded on one page of recording paper P. PA in FIG. 10(a) is the original page number, same as in the first embodiment, and PB in FIG. 10(b) is the page number of recording paper P.

Also, the similar data map as in the first embodiment is used in the second embodiment as well, but in addition to the items used in the data map in the first embodiment, the items used in the data map in the second embodiment include the recording paper page number (PB), which indicates the page number of the recording paper P on which the images written on originals are recorded, and an arrangement order (PC) on the recording paper P, which indicates the arrangement order in which the images written on the originals are recorded on recording paper P. FIG. 11 shows the data map used in the second embodiment.

In the above data map, same as in the first embodiment, each time an original is transported by the scanner portion 101 of the digital copy machine 100, an original page number (PA) line, which is the page number of the transported original, is generated and information is entered in that line. When originals are multi-fed, same as in the first embodiment, original page number (PA) lines for all of the multi-fed originals are generated and information is entered in those lines. When the original page number (PA) line for an original is generated, the recording paper page number (PB) and the arrangement order (PC) on the recording paper are automatically calculated and entered from the PA using the following formulas. M is the number of pages of originals on which images are written that are recorded on one page of recording paper, and in the above example M=4. Also, Int[x] is the integer portion of x, and x%y indicates the remainder after dividing x by y.

$$PB=Int[(PA+M-1)/M] \quad (1)$$

$$PC=(PA+M-1)\%M+1 \quad (2)$$

In the following description, an example is described in which there are 18 pages of originals, and of those, pages 11 and 12 have been multi-fed. FIG. 11 shows the state in the case of this example. In this embodiment, when multi-feeding occurs, original reading is instructed to be performed again after the initial original reading is finished, but FIG. 11 shows, similar as in the first embodiment, the state after initial original reading has finished and before original reading is performed again.

In the second embodiment, all of the PA lines in which the same PB value is entered in the PB column in the data map are referred to as PA lines with the same PB with respect to that PB. For example, in the data map in FIG. 11, the same PB value PB 2 is entered in the PB column of PA lines 5 to 8, so all of the PA lines 5 to 8 are PA lines with the same PB with respect to PB 2.

Figure 12:
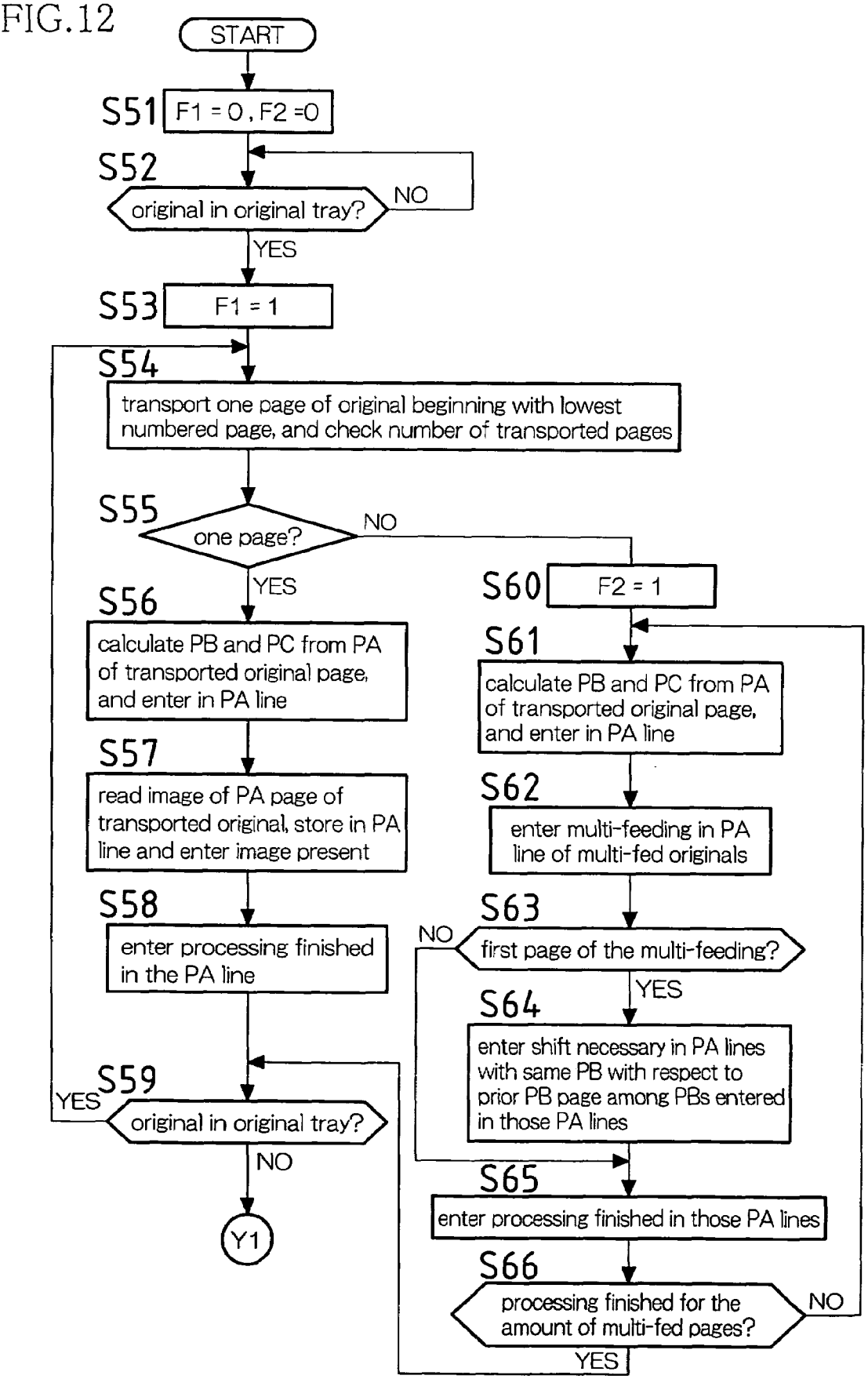
FIG. 12 is a flowchart (part 1) showing an original reading operation in the digital copy machine according to the second embodiment.
Figure 13:
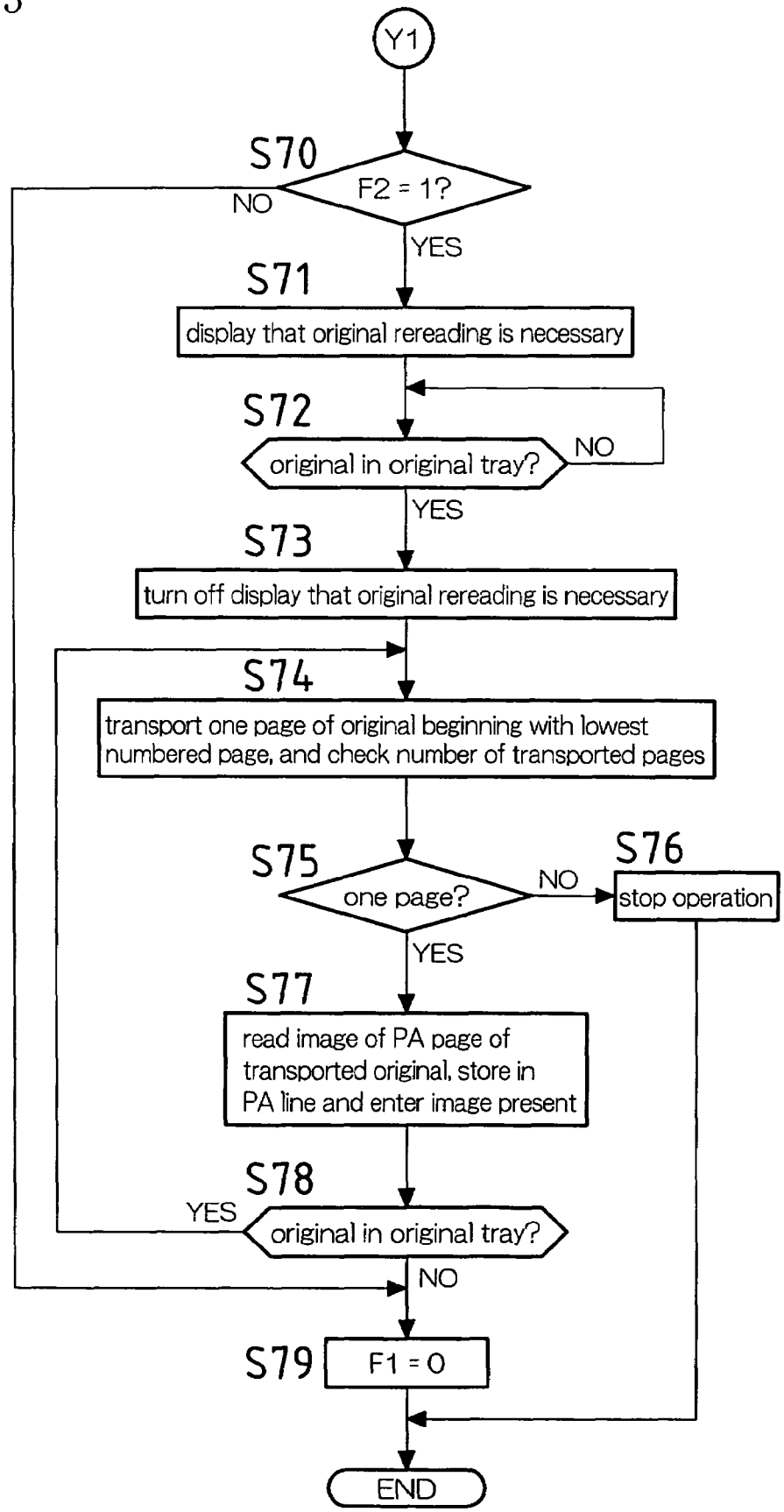
FIG. 13 is a flowchart (part 2) showing the original reading operation in the digital copy machine according to the second embodiment.
Figure 14:
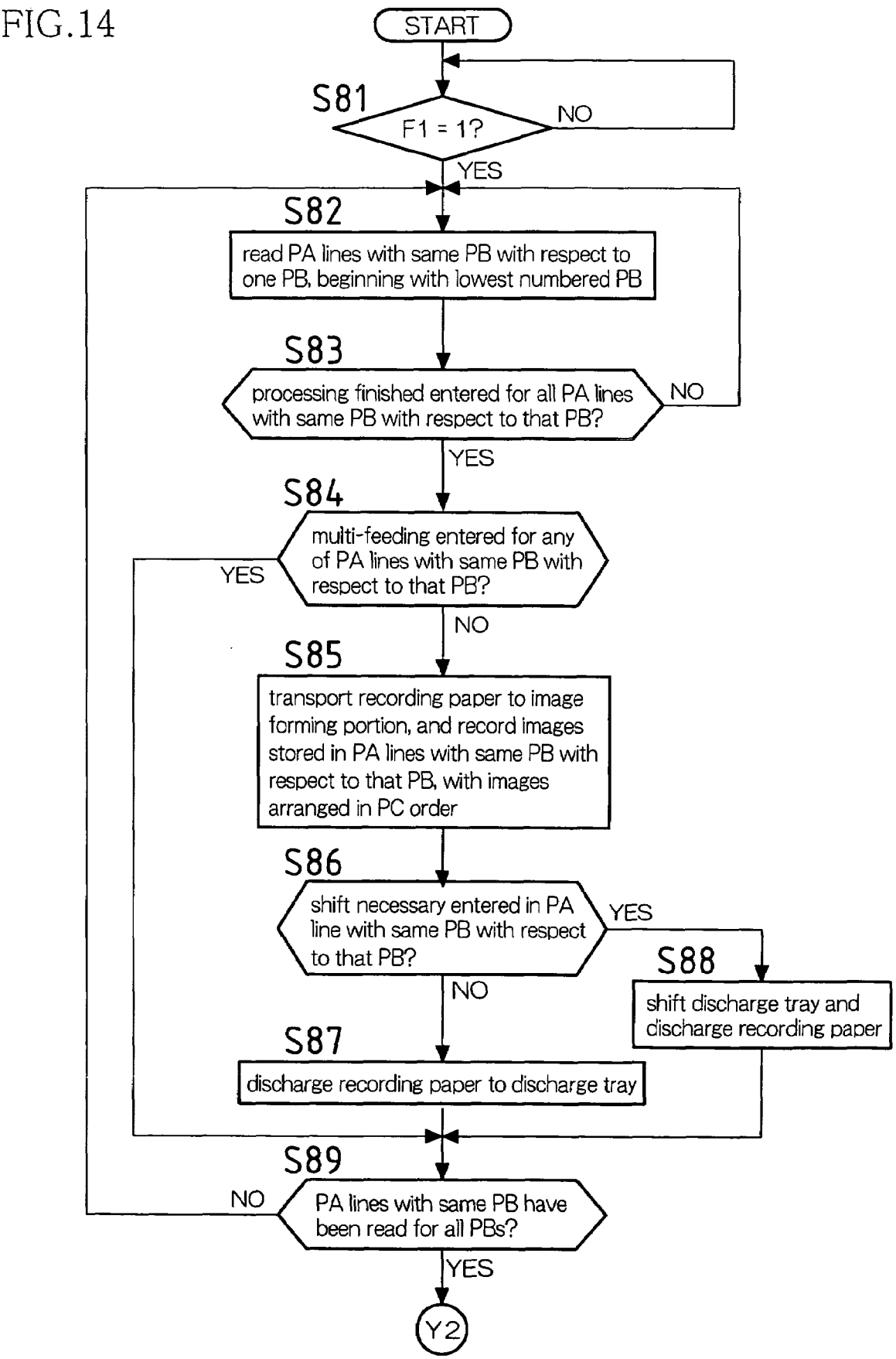
FIG. 14 is a flowchart (part 1) showing recording paper recording and discharge operations in the digital copy machine according to the second embodiment.
Figure 15:
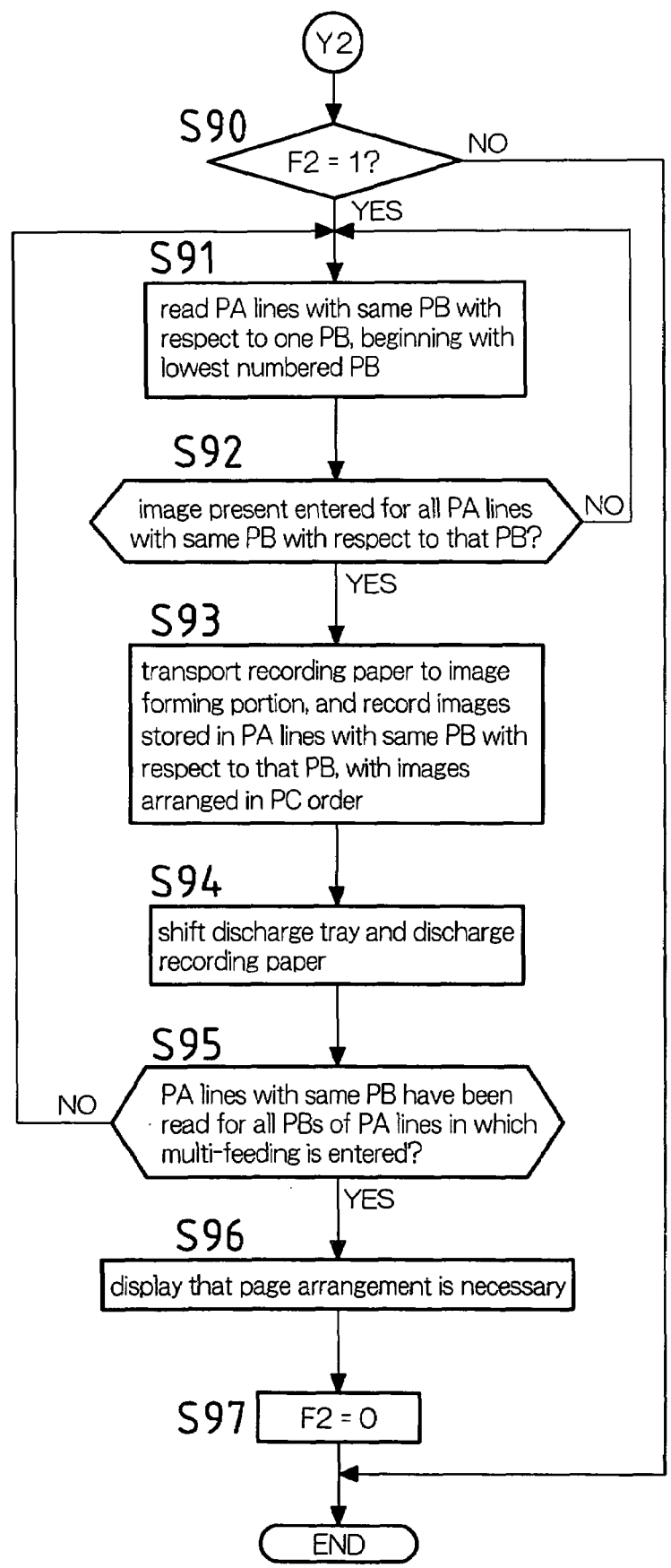
FIG. 15 is a flowchart (part 2) showing the recording paper recording and discharge operations in the digital copy machine according to the second embodiment.

Next is a description of the original reading operation, and the recording paper P recording and discharge operations, in the digital copy machine 100 using the above data map. FIGS. 12 and 13 are flowcharts showing the original reading operation in the digital copy machine 100 according to the second embodiment, and FIGS. 14 and 15 are flowcharts showing the recording paper P recording and discharge operations in the digital copy machine 100. The flow of the original reading operation shown in FIGS. 12 and 13, and the flow of the recording paper P recording and discharge operations shown in FIGS. 14 and 15, proceed approximately simultaneously in parallel, in order for original reading and recording to recording paper P to be performed simultaneously in parallel. Also, these operations are performed by cooperative operation of the aforementioned hardware and software of the control portion 104.

First is a description of the original reading operation. In the original reading operation, same as in the first embodiment, the reading start flag F1 and the multi-feed flag F2 are used as control flags. The reading start flag F1 indicates that the digital copy machine 100 has started original reading, and the multi-feed flag F2 indicates that multi-feeding has occurred during transport of originals.

In FIGS. 12 and 13, initially, after resetting the reading start flag F1 and the multi-feed flag F2 (F1=0, F2=0)(Step S51), a check is performed of whether or not an original is in the original tray 1, that is, whether or not an original has been placed in the original tray 1 (Step S52). When an original is placed in the original tray 1 by an operator or the like of the digital copy machine 100 (Step S52), the reading start flag F1 is set (F1=1)(Step S53).

Next, in order to read the images written on the originals with the scanner portion 101 of the digital copy machine 100, the originals are transported in order page by page, and at this time the number of pages of transported originals is checked (Step S54). As described above, when an original is properly transported, the number of transported pages is one page, but when multi-feeding occurs, the number of transported pages is a plurality of pages, and as described above, the number of pages of originals multi-fed simultaneously is obtained by computation. The originals multi-fed simultaneously correspond to the aforementioned multi-fed originals.

So, when it is determined from the check in Step S54 that the number of pages of transported originals is one page (Step S55), first, PB and PC are calculated from the PA of the transported page, and the resulting information is entered in the PB column and PC column of the PA line in the data map (Step S56). Because the number of pages of transported originals is one page, the original is being properly transported, and so the image of the original read by the scanner unit 23 is stored in the "image data storage area" of the PA line corresponding to the PA page of the transported original in the data map, and after entering image present in the "image present" column (Step S57), processing finished is entered in the "processing finished confirmation" column (Step S58). PA lines 1 to 10, and PA lines 13 to 18 in the data map in FIG. 11 correspond to the PA lines of the data map entered by the processing of Steps S56 to S58 in the above example.

When it is determined from the check in Step S54 that the number of pages of transported originals is not one page (Step S55), multi-feeding has occurred, so the multi-feed flag F2 is set (F2=1)(Step S60). Then, after PB and PC are calculated from the PAs corresponding to the multi-fed PA pages, and the resulting information is entered in the PB column and PC column of the PA lines in the data map (Step S61), multi-feeding is entered in the "multi-feeding" column (Step S62).

Multi-feeding is a state in which a plurality of pages of originals is transported stacked together. So, next a check is performed of whether or not the PA page is the first page of the plurality of pages of originals in the multi-feeding (Step S63), and if the PA page is the first page, the processing in Step S64 is performed. In Step S64, shift necessary is entered in the "shift necessary" column of each of the PA lines with the same PB with respect to the previous page PB, which has a PB value that is prior (one page prior) to the value of the PB entered in the PB column of the PA line corresponding to that PA page (Step S64). Then, processing finished is entered in the "processing finished confirmation" column of those PA lines in the data map (Step S65).

When the processing in Step S65 finishes, a check is performed of whether or not the above processing is finished for the number of pages multi-fed (Step S66), and if that processing is not finished, the flow of processing returns to Step S61 and the above processing is repeated. However, if that PA page is not the first page in the multi-feeding, that is, if that PA page is the second or subsequent page (Step S63), after the processing in Step S62, the processing in Step S65 is immediately performed without performing the processing in Step S64.

In the above example, pages 11 and 12 of originals are multi-fed, so first, multi-feeding is entered in the "multi-feeding" column of PA line 11 in the data map in FIG. 11 (Step S62). Also, because page 11 of originals is the first page of the plurality of pages of originals in the multi-feeding (Step S63), the processing in Step S64 is performed. In the processing in Step S64, the page number of the recording paper P on which the image written on PA page 11 of originals is recorded is 3, which is entered in the PB column of PA line 11 of the data map in FIG. 11. That is, the image written on page PA 11 of the originals is recorded on page PB 3 of the recording paper P.

So, page PB 2, which is one page before page PB 3, is the above prior page PB, and shift necessary is entered in the "shift necessary" column of each PA line with the same PB with respect to PB 2, which corresponds to page PB 2 (Step S64). When entry of shift necessary is finished, processing finished is entered in the "processing finished confirmation" column in line PA 10 in the data map (Step S65).

In the above example, the multi-fed pages are pages PA 11 and PA 12, so next, the same processing as described above it also performed for PA 12 (Step S66), but the processing in Step S64 is not performed because page PA 12 is not the first page of the plurality of pages of originals in the multi-feeding (Step S63). That is, lines PA 11 and PA 12 in the data map in FIG. 11 correspond to the PA lines in which information is entered by the processing in above Steps S61 to S65. Also, lines PA 5 to PA 8 correspond to the PA lines in which information is entered by the processing in Step S64.

When the processing in Steps S56 to S58 is finished in the case that originals have been properly transported, or when the processing in Steps S61 to S65 for a plurality of multi-fed pages is finished in the case that multi-feeding occurred (Step S66), a check is performed of whether or not an original remains in the original tray 1 without being transported, that is, whether or not there is an original in the original tray 1 (Step S59). When there is an original, the flow of processing returns to Step S54, and the above processing is repeated. When transport of all of the originals is finished, that is, when there are no more originals in the original tray 1 (Step S59), the flow of processing proceeds to Step S70.

The content of the processing in Steps S70 to S79 performed next is approximately the same as in Steps S15 to S24 in the first embodiment. That is, in Step S70, a check is performed of whether or not the multi-feed flag F2 is set, and if the multi-feed flag F2 is not set, multi-feeding has not occurred, and transport and reading of originals is being performed properly, so the reading start flag F1 is reset (Step S79) and then the original reading operation of the digital copy machine 100 is finished.

In Step S70, if the multi-feed flag F2 is set, multi-feeding has occurred, so a display that original rereading is necessary is performed in the display portion 105 (Step S71). In this case, it is necessary to reread the multi-fed originals, so the multi-fed originals are again placed in the original tray 1 by an operator or the like of the digital copy machine 100. Then, a check is performed of whether or not an original for which rereading is necessary is placed in the original tray 1, that is, whether or not there is an original in the original tray 1 (Step S72), and when an original is placed in the original tray 1, the display that original rereading is necessary in the display portion 105 is turned off (Step S73), originals are transported page by page in the page order in which they were placed in the original tray 1, and a check is performed of the number of pages transported (Step S74). If the number of pages is not one page (Step S75), it is deemed that multi-feeding has occurred again and thus there is a problem with adjustment of the original transport mechanism 4 of the digital copy machine 100, and so operation of the digital copy machine 100 is stopped (Step S76).

If the number of pages transported in Step S75 is one page, original transport is proper, so original reading is performed, the read image is stored in the empty "image data storage area" column of the PA line corresponding to the PA page of the original, and image present is entered in the likewise empty "image present" column (Step S77). In the above example, pages 11 and 12 of originals are multi-fed pages, and will be reread, so the (*2) portions in the data map in FIG. 11 correspond to those pages.

When the processing in Step S77 finishes, a check is performed of whether or not an original that has not yet been transported remains in the original tray 1, that is, whether or not there is an original in the original tray 1 (Step S78), and if there is an original in the original tray 1, the flow of processing returns to Step S74 and the above processing is repeated. When transport of all of the originals finishes, that is, when there are no more originals in the original tray 1 (Step S78), the reading start flag F1 is reset (Step S79), and then the original reading operation of the digital copy machine 100 ends.

Next is a description of the recording paper P recording and discharge operations in the digital copy machine 100. In the recording paper P recording and discharge operations, same as in the first embodiment, similar as in the original reading operation, the reading start flag F1 and the multi-feed flag F2 are used as control flags.

In FIGS. 14 and 15, in the recording paper P recording and discharge operations it is assumed that the reading operation has been performed. So, first, a check is performed of whether or not the digital copy machine 100 has started the reading operation, that is, whether or not the reading start flag F1 is set (Step S81), and if the reading start flag F1 is set, original reading has started in the digital copy machine 100, so the flow of the operation to record read images to recording paper P, and the operation to discharge recording paper P on which an image has been recorded, is started.

The data of all of the PA lines with the same PB with respect to the PB with the lowest number entered in the PB column is read from the data map (Step S82). In the above example, as is understood from the data map in FIG. 11, there are ordinarily four PA lines with the same PB, that is, the PA lines in which the PB value entered in the PB column is the same, with respect to each PB.

Then, a check is performed of whether or not processing of the data of all of the PA lines with the same PB with respect to that PB, which were read in Step S82, is finished, that is, whether or not processing finished is entered in the "processing finished confirmation" column of all of the PA lines with the same PB with respect to that PB (Step S83). The reason for this is that, as described above, because original reading and recording to recording paper P are performed simultaneously in parallel, when recording to recording paper P, it is necessary to confirm that reading of an original whose image is to be recorded is finished.

If processing of the data of all of the PA lines with the same PB with respect to that PB is finished (Step S83), the flow of processing proceeds to Step S84. In Step S84, a check is performed of whether there isn't a multi-fed page among the pages of originals corresponding to all of the PA lines with the same PB with respect to that PB, that is, whether or not multi-feeding is entered in the "multi-feeding" column of any of the PA lines among the PA lines with the same PB with respect to that PB (Step S84). This is a check of whether or not there is a multi-fed page among the originals on which are recorded the images recorded on the recording paper P of the PB page corresponding to that PB. If there is a multi-fed page, it is not necessary to record the PB page corresponding to that PB onto recording paper P, so the flow of processing proceeds to Step S89.

In the above example, when PB 3 is the PB in the data map in FIG. 11 (Step S82), all of the PA lines with the same PB with respect to PB 3, are lines PA 9 to PA 12. Among these, multi-feeding is entered in the "multi-feeding" columns of lines PA 11 and PA 12 (Step S84). So, in this case, it is not necessary to record page PB 3, which corresponds to this PB 3, to recording paper P, and at this stage, images of pages PA 9 to PA 12 of originals expected to be recorded on page PB 3 of recording paper P are not recorded to recording paper P, and recording paper P is not discharged. That is, in the data map in FIG. 11, PB 3 corresponds to this PB, and lines PA 9 to PA 12 correspond to the PA lines corresponding to the original page of the image recorded to page PB 3 of recording paper P, corresponding to this PB 3. Also, the four pages of originals pages PA 9 to PA 12, which correspond to lines PA 9 to PA 12, correspond to the aforementioned simultaneously recorded originals.

If there is not a multi-fed page among the pages of originals corresponding to all of the PA lines among the PA lines with the same PB with respect to that PB (Step S84), recording paper P is transported from a paper feed cassette to the image forming portion 102, and the images stored in the "image data storage area" of all of the PA lines with the same PB with respect to that PB in the data map are recorded on recording paper P arranged in the arrangement order of PC (Step S85).

In the above example, PB 1, PB 2, PB 4, and PB 5 correspond to the PB, and lines PA 1 to PA 8 and PA 13 to PA 18 correspond to the PA lines corresponding to the originals of the images recorded to recording paper P of page PB 1, page PB 2, page PB 4, and page PB 5, that is, the PA lines with the same PB with respect to that PB.

When the processing in Step S85 finishes, a check is performed of whether or not shift necessary is entered in the "shift necessary" column of all of the PA lines with the same PB with respect to that PB (Step S86), and if shift necessary is not entered, the recording paper P recorded in Step S85 is discharged as-is to the discharge tray 51 after being transported to the finishing apparatus 50 (Step S87), and then the flow of processing proceeds to Step S89.

In the second embodiment, the state in which the recording paper P has been discharged to the discharge tray 51 is the same as in the case of the first embodiment. That is, the drawings showing the state in which the recording paper P has been discharged to the discharge tray 51 in the second embodiment, viewed from above the discharge tray 51, are FIGS. 9(a) to 9(d), same as for the first embodiment. The arrow in FIGS. 9(a) to 9(d) indicates the discharge direction of the recording paper P. FIG. 9(a) shows a state in which, in the case of the above example, recording paper P has been discharged to the discharge tray 51 in Step S87. The recording paper P is discharged to the standard discharge position 71 in the discharge tray 51.

In Step S86, if shift necessary is entered in the "shift necessary" column of all of the PA lines with the same PB with respect to that PB, when the recording paper P of the recorded page PB corresponding to that PB has been transported to the finishing apparatus 50, processing is performed in which the recording paper P is discharged after shifting the discharge tray 51 to the left in the direction perpendicular to the discharge direction of the recording paper P, and after discharge the discharge tray 51 is again returned to its original position (Step S88). The recording paper P of the page PB corresponding to that PB, for which shift necessary is entered in the "shift necessary" column of all of the PA lines with the same PB with respect to that PB, corresponds to the aforementioned pre-multi-feeding original recording paper.

In the above example, in the data map in FIG. 11, PB 3 corresponds to that PB, for which shift necessary is entered in the "shift necessary" column of all of the PA lines with the same PB with respect to that PB, and lines PA 9 to PA 12 correspond to the PA lines with the same PB with respect to PB 3. Also, the recording paper P of page PB 3 corresponding to PB 3 corresponds to the aforementioned pre-multi-feeding original recording paper. FIG. 9(b) shows, in the case of the above example, a state in which the recording paper P of the page PB corresponding to that PB has been discharged to the discharge tray 51 in Step S88, and the recording paper discharged in Step S88 is positioned at the shifted discharge position 72, which is nearer to the right side than the position of other recording paper P.

The above pre-multi-feeding original recording paper, when discharged to the discharge tray 51, as described above, is discharged to a different discharge position than other recording paper. Due to multi-feeding when transporting originals, the image of an original is not recorded onto recording paper P, but is recorded afterward, so it is necessary to arrange pages. The different discharge position is used as a mark such that when arranging pages, it is possible to easily insert, by hand, recorded recording paper P at its proper position between pages of recording paper P that was previously recorded.

When the processing in Step S88 finishes as described above, the flow of processing proceeds to Step S89. In Step S89, a check is performed of whether or not the data of all of the PA lines in the data map has been read, and if the data of all of the PA lines in the data map has not been read, the flow of processing returns to Step S82, and the above processing is repeated.

FIG. 9(c) shows, in the case of the above example, the discharge state of recording paper P after being discharged to the discharge tray 51 in Step S88. This recording paper P is discharged to the standard discharge position 71. In this state, only the pre-multi-feeding original recording paper, which is recording paper P that was previously discharged in Step S88, is positioned at the shifted discharge position 72 in the discharge tray 51, protruding to the right side.

If the data of all of the PA lines in the data map have been read in Step S89, the flow of processing proceeds to Step S90. In Step S90, a check is performed of whether or not the multi-feed flag F2 is set, and if the F2 flag is not set, multi-feeding has not occurred when transporting originals, and recording to recording paper P and discharge are all finished, so processing is finished.

In Step S90, when the multi-feed flag F2 is set, multi-feeding has occurred when transporting originals, and the multi-fed originals will be reread, so it is necessary to record the images of the reread originals to recording paper P. So, beginning with the lowest numbered PB entered in the PB column of the PA lines in which multi-feeding is entered in the "multi-feeding" column in the data map, for the one PB, data of all of the PA lines with the same PB with respect to that PB is read (Step S91), and then a check is performed of whether or not there is recording of an image in all of the PA lines, that is, whether or not there is an entry of image present in the "image present" column of all of the PA lines with the same PB with respect to that PB (Step S92). If there is not an image present entry, reading of an image from the originals to be reread is not finished, so the flow of processing waits until reading finishes, and after reading of the image is finished, the recording paper P is transported from a paper feed cassette to the image forming portion 102, and the image stored in the "image data storage area" of all of the PA lines with the same PB with respect to that PB is recorded to recording paper P (Step S93). This recording paper P corresponds to the aforementioned multi-fed original recording paper.

In the above example, PB 3 corresponds to the PB, and the recording paper P of page PB 3 corresponding to PB 3 corresponds to the aforementioned multi-fed original recording paper. Lines PA 9 to PA 12 in the data map in FIG. 11 correspond to the PA lines with the same PB with respect to PB 3, which is that PB.

When the multi-fed original recording paper recorded in Step S93 is transported to the finishing apparatus 50, the multi-fed original recording paper is discharged after shifting the discharge tray 51 to the left in the direction perpendicular to the discharge direction of the recording paper P, and after discharge the discharge tray 51 is again returned to its original position (Step S94). In this manner, due to this processing, the multi-fed original recording paper, on which a reread image is recorded, is discharged to a different discharge position in the discharge tray 51 than other recording paper. This is so that it is possible for an operator or the like of the digital copy machine 100 to easily distinguish the multi-fed original recording paper on which a reread image is recorded from other recording paper.

FIG. 9(d) shows, in the case of the above example, a state in which recording paper P has been discharged to the discharge tray 51 in Step S94. The above multi-fed original recording paper is positioned at the shifted discharge position 72, which is nearer to the right side than the position of other recording paper P.

When the processing in Step S94 finishes, a check is performed of whether or not the PA lines with the same PB with respect to all of the PBs entered in the PB column of the PA lines for which multi-feeding is entered in the "multi-feeding" column have been read, (Step S95), and if the PA lines with the same PB with respect to all of the PBs have not been read, the flow of processing returns to Step S91, and the above processing is repeated. If the PA lines with the same PB with respect to all of the PBs have been read (Step S95), after a display that it is necessary to rearrange the pages of recording paper P that have been recorded is performed in the display portion 105 (Step S96), the multi-feed flag F2 is reset (Step S97), and then the recording paper P recording and discharge operations in the digital copy machine 100 are finished.

In the above second embodiment, an example was described in which there were 18 pages of originals, and of those, pages 11 and 12 were multi-fed. A case in which not only pages 11 and 12, but also page 13, is multi-fed, differs as follows. First, in the data map in FIG. 11, when also page 13 is multi-fed, multi-feeding is entered in the "multi-feeding" column in line PA 13, and likewise, (2*) is entered in the "image present" column and the "image data storage area" of line PA 13.

Also, in the above second embodiment, the multi-fed original pages are pages PA 11 and PA 12, the simultaneously recorded original pages are pages PA 9 to PA 12, the multi-fed original recording paper page is page PB 3, and the pre-multi-feeding original recording paper page is page PB 2. On the other hand when page 13 is also multi-fed, the multi-fed original pages are pages PA 11 to PA 13, the simultaneously recorded original pages are pages PA 9 to PA 16, the multi-fed original recording paper pages are page PB 3 and PB 4 and the pre-multi-feeding original recording paper page is, same as in the second embodiment, page PB 2.

The above second embodiment functions basically the same as the first embodiment, differing only in that images written on a plurality of pages of originals are recorded together on one page of recording paper. Accordingly, in the second embodiment, the same effect is provided as in the first embodiment.

Also, in the above second embodiment, same as in the first embodiment, when the number of sets recorded is one set, or alternatively, in the case of the first set when the number of sets recorded is a plurality of sets, in order to increase the processing speed, original reading and recording to recording paper are performed simultaneously in parallel. So, when multi-feeding has occurred, by performing the processing as described above, the images written on the multi-fed originals are recorded to recording paper after finishing all of the recording to recording paper of images written on properly transported originals. Thus, as described above, it becomes necessary to rearrange the pages of recording paper.

However, in the case of the remaining sets other than the first set when the number of sets recorded is a plurality of sets, even assuming that multi-feeding has occurred when transporting originals, when recording the second set, images of all of the originals have been read, so it is possible to record the images written on the originals to recording paper according to the page order of the originals. Accordingly, in this case, it is not necessary to rearrange the pages of recording paper.

So, if sacrificing somewhat of the improvement in processing speed, a system is adopted in which the images written on the originals are recorded to recording paper after images of all of the originals have been read, and the images are recorded to recording paper after images of all of the originals have been read and obtained by rereading even when multi-feeding has occurred, it is possible to eliminate the need to rearrange the pages of recording paper.

Also, in the above second embodiment, when multi-feeding during transport of originals has been detected, instead of a display that it is necessary to arrange the page numbers of the recorded recording paper performed after recording of the multi-fed original recording paper is finished, a display may be performed that it is necessary to insert the multi-fed original recording paper between the pre-multi-feeding original recording paper and the recorded recording paper discharged immediately after the pre-multi-feeding original recording paper. By doing so, it is possible to easily make an operator or the like of the image processing apparatus aware that it is necessary to insert the multi-fed original recording paper, which is recording paper on which the images written on the multi-fed originals are recorded, in the place where the recording paper on which the images of the multi-fed originals are recorded is missing, which is where the multi-fed original recording paper would properly be expected to be if there were no multi-feeding.

The present invention may be embodied in various other forms without departing from the gist or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image processing apparatus that records an image written on one page of an original to one page of recording paper, the image processing apparatus comprising:
an image reading portion that reads page by page a plurality of pages of originals on which images are written, the originals being placed in a reading tray, while transporting the originals, the image reading portion being able to detect multi-feeding of originals;
a storage portion that stores an image read by the image reading portion;
an image forming portion that forms an image on recording paper based on the image stored in the storage portion;
one or more discharge trays;
a paper transport portion that transports the recording paper to allow image recording by the image forming portion, and discharges the recording paper to one selected discharge tray among the discharge trays after image recording has been performed;
a discharge position changing portion that can change a discharge position of the recording paper in the selected one discharge tray; and
a control portion that controls the image reading portion, the storage portion, the image forming portion, the paper transport portion, and the discharge position changing portion;
wherein when the control portion detects multi-feeding during transport of the originals,
except for the multi-fed originals, which are all of the originals simultaneously multi-fed by the multi-feeding, the images written on only the other remaining originals are recorded on recording paper; and
the discharge position in the selected one discharge tray of only pre-multi-feeding original recording paper is different from the discharge position of the other recorded recording paper, the pre-multi-feeding original recording paper being recording paper on which is recorded the image written on the original transported immediately before the original initially transported among the multi-fed originals, and
wherein a direction of the change of the discharge position by the discharge position changing portion is a direction perpendicular to a discharge direction of the recording paper.

2. The image processing apparatus according to claim 1, wherein the control portion, when the multi-fed originals have been placed in the reading tray, after finishing all of the recording, records onto the recording paper the images obtained by reading page by page the multi-fed originals while transporting the multi-fed originals, and discharges all of the multi-fed original recording paper to a different discharge position in the selected one discharge tray than the other recorded recording paper that is already discharged, except for the pre-multi-feeding original recording paper, the multi-fed original recording paper being the recording paper on which the images are recorded.

3. The image processing apparatus according to claim 1, further comprising a display portion;
wherein the control portion, when multi-feeding has been detected, after reading of all of the originals is finished, allows the display portion to perform a display that it is necessary to reread the multi-fed originals.

4. The image processing apparatus according to claim 3, wherein the control portion, after recording of the multi-fed original recording paper is finished, allows the display portion to perform a display that it is necessary to arrange the page numbers of the recorded recording paper.

5. The image processing apparatus according to claim 3, wherein the control portion, after recording of the multi-fed original recording paper is finished, allows the display portion to perform a display that in order to arrange the page numbers of the recorded recording paper, it is necessary to insert the multi-fed original recording paper between the pre-multi-feeding original recording paper and the recorded recording paper discharged immediately after the pre-multi-feeding original recording paper.

6. The image processing apparatus according to claim 1, wherein a direction of the recording paper is not changed even when the discharge position is changed by the discharge position changing portion.

7. An image processing apparatus that records images written on a predetermined number of successive pages of originals together on one page of recording paper, the image processing apparatus comprising:
an image reading portion that reads page by page a plurality of pages of originals on which images are written, the originals being placed in a reading tray, while transporting the originals, the image reading portion being able to detect multi-feeding of originals;
a storage portion that stores an image read by the image reading portion;
an image forming portion that forms an image on recording paper based on the image stored in the storage portion;
one or more discharge trays;
a paper transport portion that transports the recording paper to allow image recording by the image forming portion, and discharges the recording paper to one selected discharge tray among the discharge trays after image recording has been performed;
a discharge position changing portion that can change a discharge position of the recording paper in the selected one discharge tray; and
a control portion that controls the image reading portion, the storage portion, the image forming portion, the paper transport portion, and the discharge position changing portion;
wherein when the control portion detects multi-feeding during transport of the originals,
except for the simultaneously recorded originals, which include the multi-fed originals and are originals on which are written images planned to be recorded together with images written on the multi-fed originals onto recording paper onto which images written on the multi-fed originals, which are all of the originals multi-fed at the same time by multi-feeding, are planned to be recorded if there is no multi-feeding, the images written on only the other remaining originals are recorded on recording paper; and
the discharge position in the selected one discharge tray of only pre-multi-feeding original recording paper is different from the discharge position of the other recorded recording paper, the pre-multi-feeding original recording paper being recording paper on which is recorded the image written on the original transported immediately before the original initially transported among the simultaneously recorded originals, and wherein a direction of the change of the discharge position by the discharge position changing portion is a direction perpendicular to a discharge direction of the recording paper.

8. The image processing apparatus according to claim 7, wherein the control portion, when the multi-fed originals are placed in the reading tray, after finishing all of the recording, records onto recording paper the images obtained by reading page by page the multi-fed originals while transporting the multi-fed originals, and the other images written on the simultaneously recorded originals, and discharges all of the multi-fed original recording paper to a different discharge position in the selected one discharge tray than the other recorded recording paper that is already discharged, except for the pre-multi-feeding original recording paper, the multi-fed original recording paper being the recording paper on which the images have been recorded.

9. The image processing apparatus according to claim 7, further comprising a display portion;

wherein the control portion, when multi-feeding has been detected, after reading of all of the originals is finished, allows the display portion to perform a display that it is necessary to reread the multi-fed originals.

10. The image processing apparatus according to claim 9, wherein the control portion, after recording of the multi-fed original recording paper is finished, allows the display portion to perform a display that it is necessary to arrange the page numbers of the recorded recording paper.

11. The image processing apparatus according to claim 9, wherein the control portion, after recording of the multi-fed original recording paper is finished, allows the display portion to perform a display that in order to arrange the page numbers of the recorded recording paper, it is necessary to insert the multi-fed original recording paper between the pre-multi-feeding original recording paper and the recorded recording paper discharged immediately after the pre-multi-feeding original recording paper.

12. The image processing apparatus according to claim 7, wherein a direction of the recording paper is not changed even when the discharge position is changed by the discharge position changing portion.

13. An image processing method that records an image written on one page of an original to one page of recording paper, the image processing method comprising:

a step of reading page by page a plurality of pages of originals on which images are written, the originals being placed in a reading tray, while transporting the originals, it being possible in the image reading step to detect multi-feeding of originals;

a step of storing an image read in the image reading step;

a step of forming an image on recording paper based on the image stored in the image storage step;

a step of transporting the recording paper to allow image recording by the image forming step, and discharging the recording paper to one selected discharge tray among one or more discharge trays after image recording has been performed;

a step of changing the discharge position of the recording paper in the selected one discharge tray; and a step of controlling such that when detecting multi-feeding during transport of the originals, except for the multi-fed originals, the multi-fed originals being all of the originals simultaneously multi-fed by the multi-feeding, the images written on only the other remaining originals are recorded on recording paper, and controlling such that the discharge position in the selected one discharge tray of only pre-multi-feeding original recording paper is different from the discharge position of the other recorded recording paper, the pre-multi-feeding original recording paper being recording paper on which is recorded the image written on the original transported immediately before the original initially transported among the multi-fed originals, and wherein a direction of the change of the discharge position is a direction perpendicular to a discharge direction of the recording paper.

14. The image processing method according to claim 13, wherein a direction of the recording paper is not changed even when the discharge position is changed in the step of changing the discharge position.

15. An image processing method that records images written on a predetermined number of successive pages of originals together on one page of recording paper, the image processing method comprising:

a step of reading page by page a plurality of pages of originals on which images are written, the originals being placed in a reading tray, while transporting the originals, it being possible in the image reading step to detect multi-feeding of originals;

a step of storing an image read in the image reading step;

a step of forming an image on recording paper based on the image stored in the image storage step;

a step of transporting the recording paper to allow image recording by the image forming step, and discharging the recording paper to one selected discharge tray among one or more discharge trays after image recording has been performed;

a step of changing the discharge position of the recording paper in the selected one discharge tray; and a step of controlling such that when detecting multi-feeding during transport of the originals, except for the simultaneously recorded originals, the simultaneously recorded originals including the multi-fed originals and being originals on which are written images planned to be recorded together with images written on the multi-fed originals onto recording paper onto which images written on the multi-fed originals, the multi-fed originals being all of the originals multi-fed at the same time by multi-feeding, are planned to be recorded if there is no multi-feeding, the images written on only the other remaining originals are recorded on recording paper, and controlling such that the discharge position in the selected one discharge tray of only pre-multi-feeding original recording paper is different from the discharge position of the other recorded recording paper, the pre-multi-feeding original recording paper being recording paper on which is recorded the image written on the original transported immediately before the original initially transported among the simultaneously recorded originals, and wherein a direction of the change of the discharge position is a direction perpendicular to a discharge direction of the recording paper.

16. The image processing method according to claim 15, wherein a direction of the recording paper is not changed even when the discharge position is changed in the step of changing the discharge position changing portion.

* * * * *